(12) United States Patent
Liao et al.

(10) Patent No.: US 11,860,356 B2
(45) Date of Patent: Jan. 2, 2024

(54) ADAPTIVE INNER LOOP GAIN CONTROL FOR LASER BEAM SCANNING DISPLAYS

(71) Applicant: MICROSOFT TECHNOLOGY LICENSING, LLC, Redmond, WA (US)

(72) Inventors: Wenjun Liao, Mountain View, CA (US); Algird Michael Gudaitis, Fall City, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/465,812

(22) Filed: Sep. 2, 2021

(65) Prior Publication Data
US 2023/0069514 A1 Mar. 2, 2023

(51) Int. Cl.
*G02B 26/12* (2006.01)
*G02B 26/10* (2006.01)
(Continued)

(52) U.S. Cl.
CPC ....... *G02B 26/122* (2013.01); *G02B 26/0858* (2013.01); *G02B 26/101* (2013.01); *G02B 27/0172* (2013.01); *G02B 2027/0178* (2013.01)

(58) Field of Classification Search
CPC ................ G02B 26/122; G02B 26/0858; G02B 26/101; G02B 26/0172; G02B 26/0178
See application file for complete search history.

(56) References Cited

U.S. PATENT DOCUMENTS

2010/0079836 A1* 4/2010 Rothaar ............... G02B 26/101
359/223.1
2016/0255316 A1* 9/2016 Kobori ................. H04N 9/3161
348/746
(Continued)

FOREIGN PATENT DOCUMENTS

WO 2021040819 A1 3/2021

OTHER PUBLICATIONS

"Notice of Allowance Issued in U.S. Appl. No. 17/359,500", dated Jul. 18, 2022, 9 Pages.
(Continued)

*Primary Examiner* — Priyank J Shah
(74) *Attorney, Agent, or Firm* — Tyler Thorp; Newport IP, LLC

(57) ABSTRACT

This disclosure provides methods and systems that adaptively adjust the gain of the drive signal to a slow-scan mirror to compensate and stabilize the mirror to achieve desired performance metrics. Non-ideal characteristics of the slow-scan mirror, including the mirror and related assembly, exhibit behaviors that impact the overall gain of the device, which changes over time and operating environment. To compensate for these non-ideal characteristics, the drive signal to the slow-scan mirror may need to be adjusted to achieve the desired beam deflection angle. An adaptive inner loop gain control structure may be employed to dynamically adjust the gain of the inner-control loop to achieve a target gain such that the overall gain variations from the slow scan mirror and other components are scan mirror such that compensated and stabilized. The parameters, logic and blocks of the inner loop gain control may be implemented in hardware, software, or combinations thereof.

19 Claims, 26 Drawing Sheets

(51) Int. Cl.
*G02B 26/08* (2006.01)
*G02B 27/01* (2006.01)

(56) References Cited

U.S. PATENT DOCUMENTS

| | | |
|---|---|---|
| 2019/0324266 A1 | 10/2019 | Hayashi |
| 2019/0373140 A1 | 12/2019 | Gudaitis et al. |
| 2020/0285047 A1* | 9/2020 | Pu .................... G02B 27/0172 |

OTHER PUBLICATIONS

Frigerio, et al., "A Novel Closed-loop Architecture for Accurate Micromirror Trajectory Control in Linear Scanning MEMS-based Projectors", In Proceedings of SPIE, vol. 11697, Mar. 5, 2021, 10 Pages.

"International Search Report and Written Opinion Issued in PCT Application No. PCT/US22/029726", dated Sep. 6, 2022, 14 Pages.

"International Search Report and Written Opinion Issued in PCT Application No. PCT/US22/039353", dated Oct. 12, 2022, 13 Pages.

\* cited by examiner

ADAPTIVE INNER LOOP GAIN CONTROL FOR LASER BEAM SCANNING DISPLAYS

BACKGROUND

Laser beam scanning ("LB S") display devices form displayed images by using mirrors, such as microelectromechanical systems ("MEMS") mirrors, to direct a laser beam onto a display region. In such display devices, the mirrors may move over the course of a frame to control the location in the display region toward which the laser beam is directed. Some LBS displays use two mirrors, a fast-scan mirror that scans under resonance and a slow-scan mirror that scans linearly. Mirrors used by LBS display devices are susceptible to noise and disturbance forces (e.g., electrical, mechanical, etc.).

In addition to the aforementioned issue, existing systems have a number of other drawbacks. For example, a mirror using certain materials may degrade over time, which can result in poor performance. Additionally, environmental changes (e.g., temperature, humidity, etc.) may also cause changes in characteristics of a mirror. In yet another example, each manufactured mirror may have variations in certain characteristics, such as gain, that are caused by the manufacturing process. These issues, and others, may result in wide performance variations, such as gain variations.

The disclosure made herein is presented with respect to these and other technical challenges.

SUMMARY

The techniques disclosed herein provide methods and systems that adaptively adjust the gain of the drive signal to a slow-scan mirror to compensate and stabilize the mirror to achieve desired performance metrics. Non-ideal characteristics of the slow-scan mirror, including the mirror and related assembly, exhibit behaviors that impact the overall gain of the device. Example characteristics that may impact gain include manufacturing differences between devices, material degradation resulting from mirror use and age, as well as environmental conditions such as temperature and humidity. To compensate for these non-ideal characteristics, the drive signal to the slow-scan mirror may need to be increased to achieve the desired beam deflection angle. Generally described herein, a slow-scan controller generates a drive signal for the slow-scan mirror with an adaptive inner loop gain control structure that detects feedback from the slow-scan mirror and dynamically adjust the gain of the inner-control loop to achieve a target gain such that the overall gain variations of the inner loop, inclusive of the slow scan mirror and other components, are compensated and stabilized. The parameters, logic and blocks of the inner loop gain control may be implemented in hardware, software or combinations thereof.

The described embodiments may be implemented as hardware, software, or a combination of hardware and software. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1A:
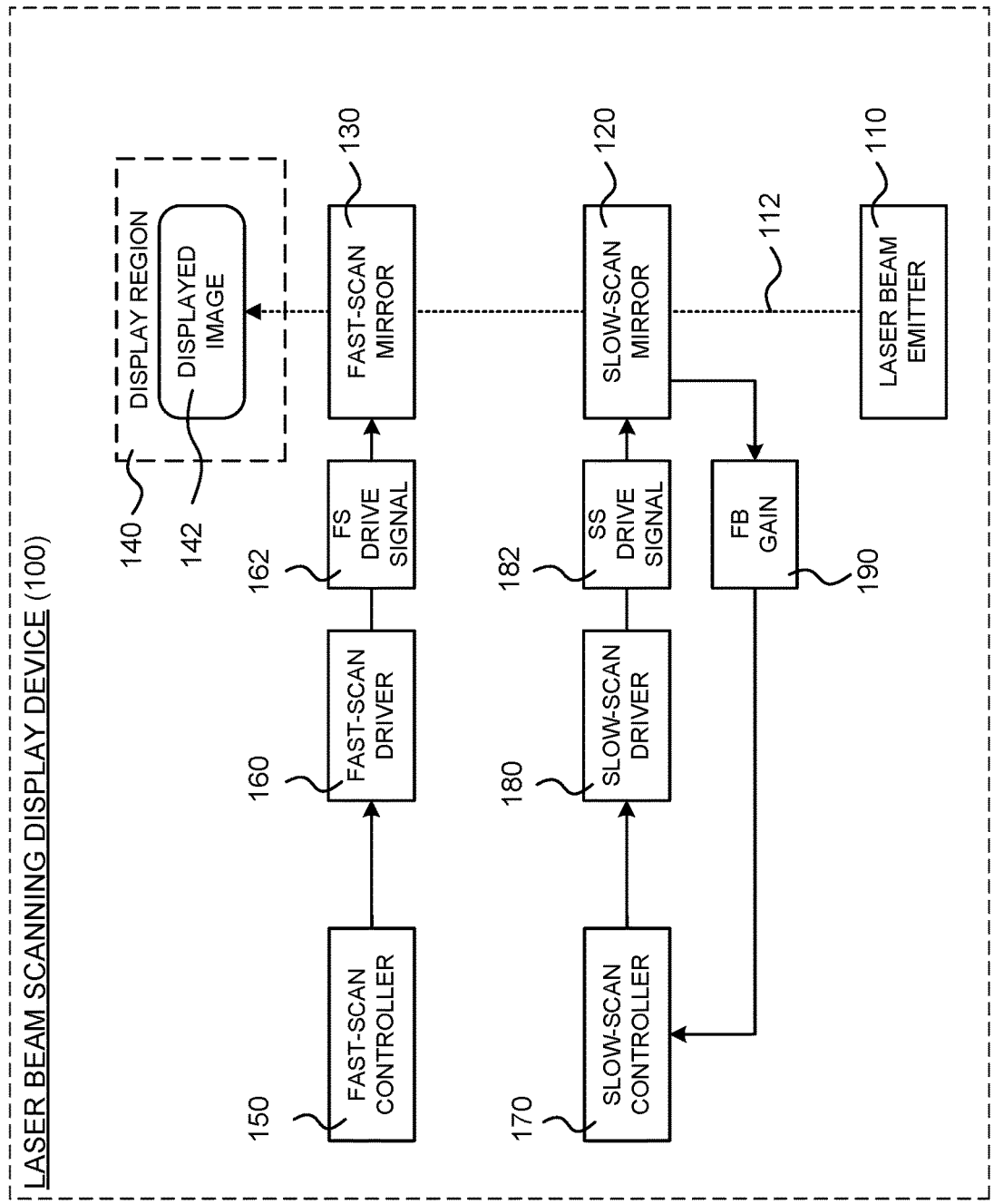
FIG. 1A shows an illustrative laser beam scanning display system.

The following detailed description is directed to technologies for improving display image quality in a laser beam scanning ("LBS") display device. A laser beam scanning ("LBS") display device typically includes a laser beam emitter, a slow-scan (SS) controller and driver, a fast-scan (FS) controller and driver, a slow-scan (SS) mirror, and a fast-scan (FS) mirror. The laser beam emitter is configured to emit a laser beam to the FS and SS mirrors, which may be implemented as microelectromechanical systems ("MEMS"). The FS mirror, under control of the FS controller, scans across one axis of the display under resonance (e.g., vertical scanning of the display). The SS mirror, under control of the SS controller, scans linearly across another axis of the display ((e.g., horizontal scanning of the display).

The slow-scan controller in the LBS display device includes an inner control loop that is used for trajectory control, disturbance rejection, and noise suppression. The linearity and gain of the SS trajectory is an important aspect of display image quality in an LBS display device. To control the SS mirror assembly, the SS controller may utilize two control loops, an outer control loop for open angle control (OAC), and an inner control loop for gain and stability control. The overall gain of this inner loop should be kept as close to constant as possible to maintain optimum performance (e.g. reduced jitter, even scan lines, etc.). When the loop gain is either higher or lower than the desired value, the SS control loop may be more vulnerable to external disturbances, which may result in more jitter or uneven scan line density in the resulting display images.

Since the SS mirror is often implemented as a MEMS device, the SS mirror is often driven with a voltage that uses a PZT material (Lead Zirconate Titanate). However, the PZT material degrades quickly over time (e.g., about one hundred hours of use), which results in poor performance. Additionally, environmental changes (e.g., temperature, humidity, etc.) may also cause changes in the overall gain of the SS mirror. In yet another example, each manufactured mirror may have variations in gain that are due to the manufacturing process, which may result in wide gain variations. The inner loop of the presently disclosed technology compensates for these types of changes in gain, and others, by altering the drive signal to the slow-scan mirror.

Through implementations of the disclosed technologies, an LBS architecture may be implemented to improve disturbance rejection, improve noise suppression, and compensate for manufacturing variations as well as changes in environmental conditions such as temperature and humidity. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for protecting mirrors in an LBS display device will be described.

FIG. 1A shows an illustrative laser beam scanning (LBS) display device 100. As illustrated, the LBS display device 100 includes a laser beam emitter 110 that generates an incident beam 112 that is deflected by a FS mirror 130 and a SS mirror 120. Beam deflection along a first axis (e.g., vertical axis) is provided by the FS mirror 130 in response to a FS drive signal 162, which is provided by a FS controller 150 via a FS driver 160. Beam deflection along a second axis (e.g., horizontal axis) is provided by the SS mirror 120 in response to a SS drive signal 182, which is provided by a SS controller 170 via a SS driver 180. The FS mirror 130 and the SS mirror 120 may be MEMS mirror devices. In such LBS display devices, a mirror drive waveform is generated by each of the respective controllers to direct the laser beam 112 over the course of a frame to display an image 142 in a display region 140.

The SS mirror 120 and the FS mirror 130 may be configured to direct (e.g., reflect, deflect, steer, etc.) the emitted laser beam 112 onto the display region 140. The displayed image 142 may be displayed in one or more frames in which the slow-scan mirror 120 and the fast-scan mirror 130 direct the laser beam 112 across the display region 140 to "draw" the displayed image 142.

In some embodiments, the SS mirror 120 is configured to complete a slow-scan period during each frame. The slow-scan period may include a display interval. The slow-scan mirror 120 may linearly scan across the display region 140 from an initial scanning position to a final scanning position. The laser beam emitter 110 may be configured to emit the laser beam 112 during the display interval. In the display interval, the fast-scan mirror 130 may perform multiple scans across the display region 310 to "draw" the displayed image 142.

The slow-scan period may further include a non-display interval. During the non-display interval, the slow-scan mirror 120 may be configured to return from the final scanning position to the initial scanning position. This portion of the non-display interval may also be referred to as "the flyback."

During the non-display interval, the laser beam emitter 110 may be configured to not emit the laser beam 112. In some embodiments, the display region 140 may include one or more blank regions in which the displayed image 142 is not displayed. In addition to the flyback, the non-display interval may include time during which the slow-scan mirror 120 is oriented toward the one or more blank regions. The initial scanning position and the final scanning position may be located in the one or more blank regions.

As also described briefly above, the SS mirror 120 used by LBS display device 100 may be susceptible to electrical and mechanical disturbances, and other environmental conditions, which can cause change in the overall loop gain of the SS mirror 120. A feedback gain block 190 may be employed by the LBS display device 100 to provide feedback from the SS mirror 120 to the SS controller 170, where the SS controller 170 may compensate for changes in the loop gain of the SS mirror.

Figure 1B:
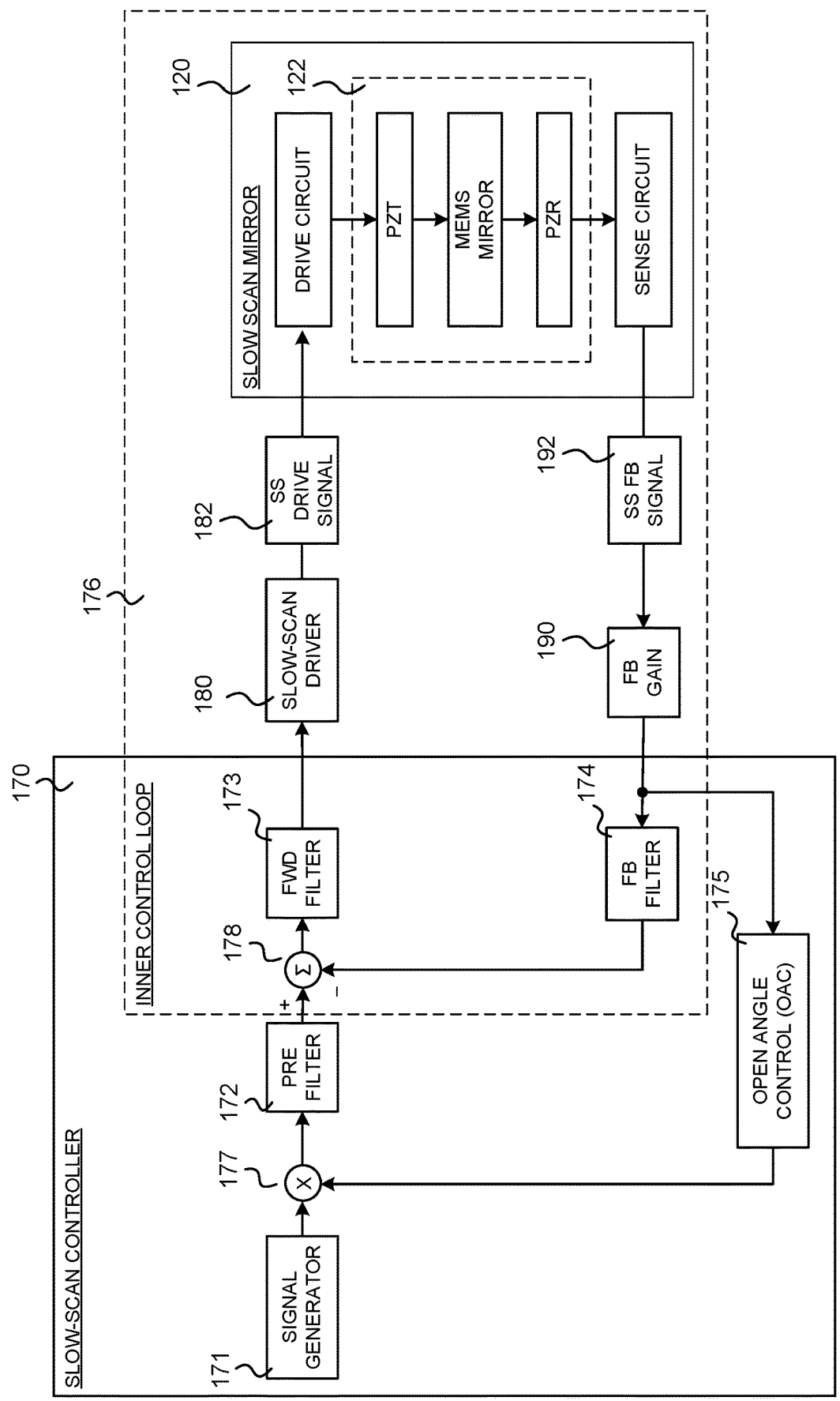
FIG. 1B shows a slow-scan controller topology for the laser beam scanning display system of FIG. 1A.

FIG. 1B shows a slow-scan (SS) controller topology for the laser beam scanning (LBS) display system of FIG. 1A. As illustrated, the slow scan controller 170 may include a signal generator 171, a pre-filter 172, a forward filter 173, a feedback filter 174, and an open angle control (OAC) block 175. The SS controller 170 generates the SS dive signal 182 via the SS driver 180, for the SS mirror 120. The waveform that forms the overall shape of the SS drive signal 182, is generated by signal generator 171 via the operation of the pre-filter 172 and the various components of the outer and inner control loops. The outer control loop is configured to combine, via the multiplier block 177, the output of the signal generator 171 with the output of open angle control (OAC) block 175. The output of the multiplier block 177 is coupled to the input of the pre-filter 172. The inner loop 176 is configured to combine, via the summer block 178, the output of the pre-filter 172 and the feedback from the SS mirror 120 via the feedback gain block 190 and the feedback filter 174. The operation of the inner control loop will be described in more details below.

The MEMS assembly may include a Lead Zirconate Titanate (PZT) material, a MEMS mirror, and a piezo-resistive (PZR) material. The PZT material is a piezo-electric driver (or actuator) that is configured to drive the MEMS mechanical mirror in the SS mirror 120 in response to a signal (e.g., a voltage, current) from the drive circuit of the SS mirror 120. The PZR material is configured as a piezo-resistive sensor that generates a feedback signal from the SS mirror 120 based on the position or angle of the MEMS mirror via the operation of the PZR material with the sense circuit in the SS mirror 120.

As illustrated, the inner control loop 176 consists of forward filter 173, the slow scan driver 280, the SS mirror assembly 120, the feedback gain block 190, and feedback filters 174, and the summer 178, as shown in the dashed rectangle. The inner control loop 176 is a critical part of the SS controller which is used for trajectory control, disturbance rejection and noise suppression.

The loop gain of the inner control loop 176 is determined as a product Loop Gain=(Forward Filter Gain)*(SS Mirror Gain)*(Feedback Gain)*(Feedback Filter Gain). The SS Mirror Gain also includes the gain of the drive and sense circuits. This inner control loop 176 loop gain should be kept as close to constant as possible to maintain the optimum controller performance. For example, if the loop gain is higher or lower than the desired value, the SS control loop is more vulnerable to external disturbances and we may also observe more jitter or uneven scan line density in the display images.

In some examples, the forward filters, feedback filters, gain, multiplier, and summer blocks may be implemented as digital signal processing (DSP) components, which may be implemented in silicon, so the gains of these block are quite stable and have little variation once they are set. However, the SS mirror 120 and the related drive and sense circuits may be analog devices, or combinations of analog and digital devices. The inner-loop gain may change based on the performance of the various blocks m9 e.g., analog gain and filter blocks, SS mirror, etc.), which may be different from device to device (e.g., from manufacturing variations), and may also change as they age in operation over time, and may also change based on the operating environment (e.g., temperature, humidity, vibration, etc.). The presently disclosed techniques compensate for these variations to maintain the inner-loop stability.

In some examples, the SS drive signal 182 may be a digital signal (e.g., binary information, data, etc.) that is provided to the drive circuit in the SS mirror 120, which then converts the digital drive signal 182 into an analog signal (e.g., a voltage or current) that drives the PZT material. Similarly, the SS feedback signal 192 may be a digital signal that is provided by the sense circuit in the SS mirror 120, where the sense circuit is configured to convert an analog signal (e.g., a voltage or current) from the PZR material into a digital signal that is provided to the feedback gain block 190.

In the inner control loop 176, the gain block 190 helps set the overall loop gain. If the SS mirror 120 gain in one device (e.g., a VR headset) is higher than a nominal value, the feedback gain can be reduced by gain block 190 to maintain the overall desired loop gain. In this way, the gain of the SS mirror 120 can be "normalized" to maintain the inner loop as stable and consistent, even with variations from different MEMS device assemblies, with variations in gain from the different MEMS mirrors, drive and sense circuits. However, the variations in gain may change due to other factors such as a degradation of material that occurs as the MEMS assembly is used, as well as other variations that occur such as temperature and humidity variations.

As stated previously, the SS mirror 120 may be driven with a voltage by using the PZT (Lead Zirconate Titanate) material, while movement of the SS mirror 120 may be sensed through a signal generated by the PZR (piezo-resistive) sensor. Thus, the gain through the MEMS assembly can be defined as PZT drive gain (open angle/drive voltage)*PZR gain (feedback voltage/open angle). The presently disclosed technology has identified that the PZT material deteriorates quickly (e.g., within hundreds of hours of use), and hence the scanning angle versus voltage will change over time.

Figure 1C:
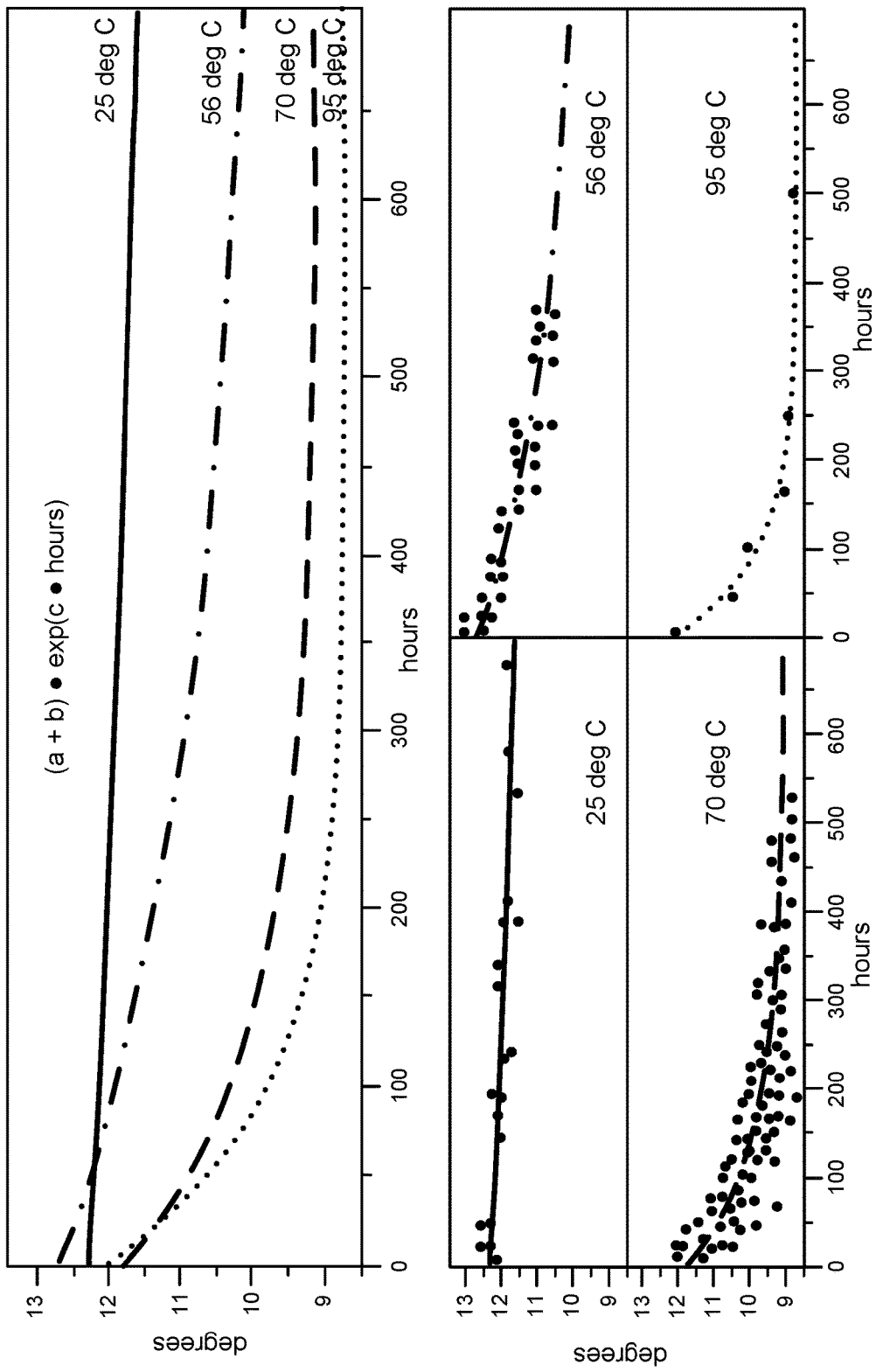
FIG. 1C shows graphs that illustrate changes in the performance of the slow-scan mirror over time.

FIG. 1C shows graphs that illustrate changes in the performance of the slow-scan mirror over time. As shown, the open loop scan angle for a constant voltage changes based on both operating time and temperature. The PZT "gain" degrades over time, which reduces the vertical field of view (VFOV) for a fixed range of drive voltages. To keep a constant VFOV, the open angle control (OAC) block thus needs to apply higher and higher drive voltages to the SS mirror, which may hasten further degradation in the PZT material of the SS mirror assembly. Although the VFOV may be kept substantially the same by the operation of the outer control loop with the OAC block, the loop gain of the inner control loop may remain uncompensated. Thus, the larger the open angle, the faster the PZT material will degrade, with lower and lower gains in the PZT material. For wide viewing angle targets, e.g. 35 to 45 degrees angles, the challenges of lost gain are too great for simple gain compensation.

For SS mirror devices operating over wider and wider temperature ranges, there are significant variations in the gain of both the PZT and PZR materials. As shown in FIG. 1C, the loss of angle for constant voltage is significantly faster for increased temperatures. For example, at 200 hours of use, the loss in angle is less than 1 degree at 25 deg C, about 1.5 degrees at 56 deg C, about 2.5 degrees at 70 deg C, and about 4 degrees at 95 degrees C. Thus, for higher and higher operating temperatures loss of viewing angle occurs faster and with a much more significant total loss. This wider operating temperature ranges produces variations in both the PZT and PZR gains, making the inner loop performance variable and less predictable.

A possibility compensation approach is to measure the gain at the factory and to calibrate the gain block to optimize the overall loop gain. This approach results in a calibration with a fixed parameter that is used for the life of the product. However, the gain of SS mirror assemblies may vary greatly in the manufacturing process, and a large viewing angle (e.g., about 40 degree) may be desired. Also, the gain of the SS mirror changes dramatically with temperature and humidity conditions. These varied requirements create a challenge that requires an innovation in gain balancing of the inner control loop, which are difficult to compensate.

A potential solution to the SS mirror gain degradations may be to improve the SS mirror design, by selection of a new MEMS design or by finding other new materials that have less sensitivity to such variations in manufacturing, temperature, etc. However, design of a new MEMS device with new materials requires significant processing and design work, and a solution may be difficult or practically impossible to find.

The present technique described herein propose an adaptive inner loop gain control structure where the gain of the SS mirrors, with the driver and sensor circuits of the SS mirror, are actively detected and gain compensation parameters are generated automatically to match the varying SS mirror gain in real time. The proposed adaptive inner loop gain compensation scheme may be employed to track and stabilize the inner control loop of the SS mirror in a very wide range and improve the display quality to ensure optimal performance of the display system.

Figure 2:
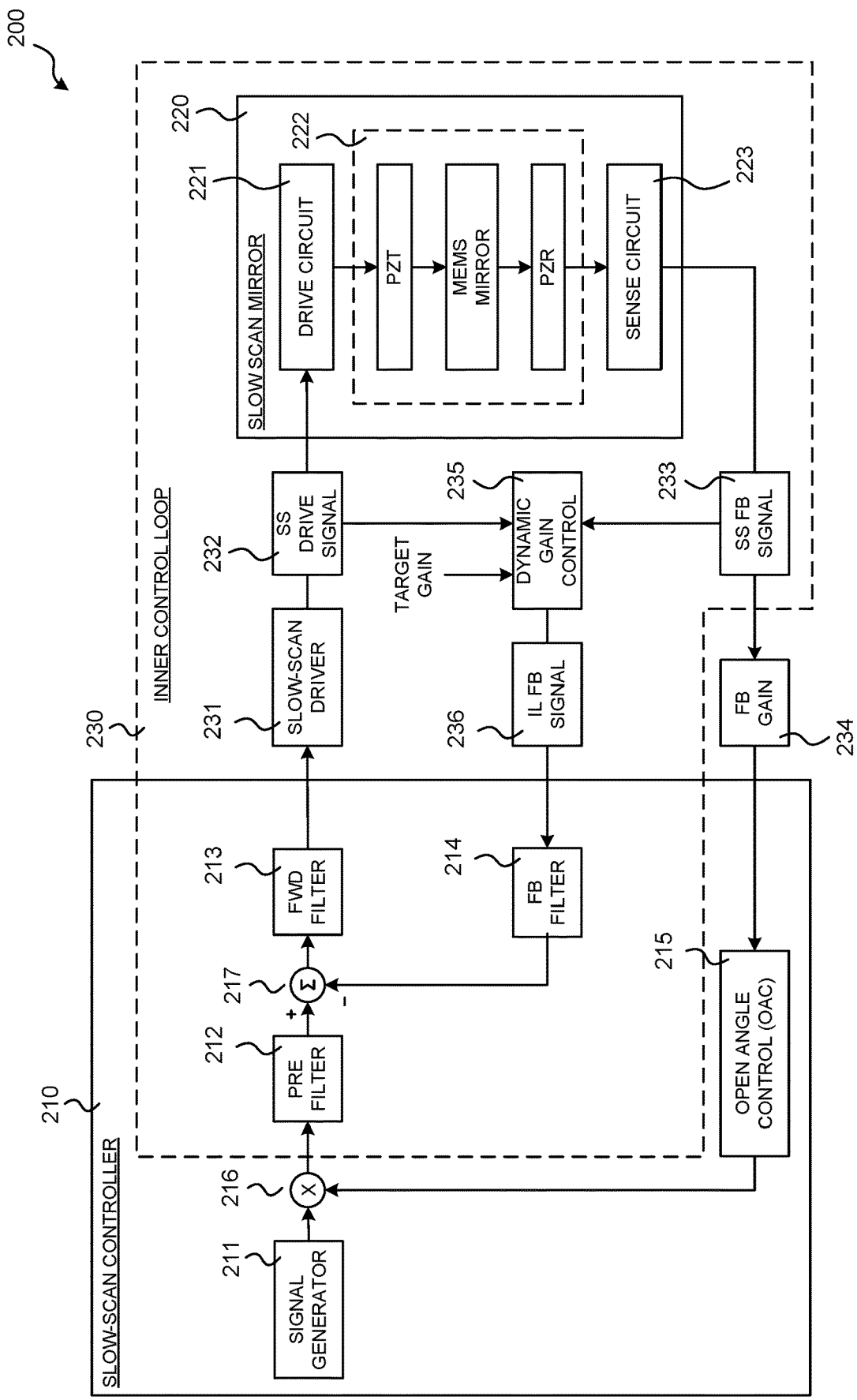
FIG. 2 shows a slow-scan controller topology for a laser beam scanning display device with an inner control loop with dynamic gain control.

FIG. 2 shows a slow-scan (SS) controller topology for a laser beam scanning (LBS) display device 200 with an inner control loop with dynamic gain control. As show, the LBS display device 200 includes a slow-scan (SS) controller 210, a slow-scan (SS) mirror 220, a slow scan driver 231, a feedback (FB) gain block 234, and a dynamic gain control block 235.

The SS controller includes a signal generator 211, a pre-filter 212, a forward filter 213, a feedback filter 214, an open angle control (OAC) block 215, a multiplier 216, and a summer 217. The SS mirror 220 includes a drive circuit 221, a MEMS assembly 222, and a sense circuit 223. The MEMS assembly 222 includes a PZT material, a MEMS mechanical mirror, and a PZR material.

The SS mirror 220 is configured to adjust the viewing angle in response to a SS drive signal 232 received from the SS driver 231, and to provide a feedback signal 233 to the FB gain block 234, where the feedback signal 233 corresponds to a measured response to the SS drive signal 232. In some implementations, the drive circuit 221 of the SS mirror 220 may include a digital-to-analog converter (DAC) to convert the SS drive signal 232 from a digital value (e.g. binary data) into an analog signal (e.g., a current or voltage) that drives the PZT material to actuate the MEMS mechanical mirror to adjust the viewing angle. In some examples, the drive circuit 221 of the SS mirror 220 may include one or more of an amplifier circuit, a limiter circuit, a filter circuit, or combinations thereof. In various implementations, the sense circuit 233 of the SS Mirror 220 may include an analog-to-digital converter (ADC) to convert an analog signal (e.g., current or voltage) from the PZR material into a digital value that indicates the measured angle of the SS mirror 220. In some other examples, the sense circuit 233 of the SS mirror 220 may include one or more of an amplifier circuit, a limiter circuit, a filter circuit, or combinations thereof.

The SS controller 210 is configured to generate the SS dive signal 232 via the SS driver 231 for the SS mirror 220. The waveform that forms the overall shape of the SS drive signal 232, is generated by signal generator 211, and further shaped and gain scaled by the operation of the pre-filter 212 and the forward (FWD) filter 213, along with the various components of the outer and inner control loops. The outer control loop is configured to combine, via operation of the multiplier 216, the output of the signal generator 211 with the output of open angle control (OAC) block 215, and to provide the combined signal to the input of the pre-filter 212. The OAC block 215 is responsive to the SS FB signal 233 from the SS mirror 220 via the feedback (FB) gain block 234. The inner loop 230 is configured to combine, via operation of the summer 217, the output of the pre-filter 212 with the inner loop feedback (IL FB) signal via the feedback (FB) filter 214.

The dynamic gain control block 235 is configured to receive the SS drive signal 232 from the SS driver 231, receive the SS FB signal from the SS mirror 230, and provide an inner-loop feedback (IL FB) signal 236 to the input of FB filter 214 of the SS controller 210. The dynamic gain control block 235 is configured to compare the SS drive signal 232 to the SS feedback signal 233 to generate the IL FB signal 236 responsive to the comparison, and also based on a desired target gain.

The waveform of the SS drive signal 232 will typically be a triangle shaped waveform such as a linear ramp or a sawtooth that drives the display (sometimes called a display ramp). The linear ramp before and after the SS mirror 220 can then be compared by the SS dynamic gain control block 235 to determine an adjustment to compensate for any mismatches in overall waveform shape. In one example, the data before and after the MEMS assembly is captured (e.g., one frame of data can be captured in a buffer to get one complete cycle of the waveform) and evaluated to find a slope for the display ramp (e.g., slope can be determined by a best fit to at least a portion of the captured SS drive signal 232); and the data after the MEMS assembly is captured to find a slope for the VPZR data (e.g., slope can be determined by a best fit to at least a portion of the captured SS FB signal 233); and the ratio of the slopes are calculated to find a quotient. For this example, the quotient can be used as a control parameter to adjust the inner loop feedback signal 236 of the SS controller since the quotient of these two slopes may be a good indication of the inner control loop gain. Typically, the best fit portion will be the middle portion of the curve, where the linearity is most consistent.

The operation of the inner control loop 230 will not influence the outer control loop with the OAC block 215 and the open angle control. The dynamic gain control block 235 will be further described with reference to the examples outlined below.

FIGS. 3A-6B show block diagrams of various example dynamic gain controllers for the inner control loop of a laser beam scanning (LBS) display device.

For each of the examples illustrated below, characteristics for the SS drive signal 232 and the SS FB signal 233, and a gain adjustment is made to the IL FB signal 236 to effect a change in the loop gain of the inner control loop based on the comparison between the signal characteristics in real time. The characteristics of the SS drive signal 232, and the characteristic of the SS FB signal are compared to determine if there are gain variations that can be compensated for in the real time.

Figure 3A:
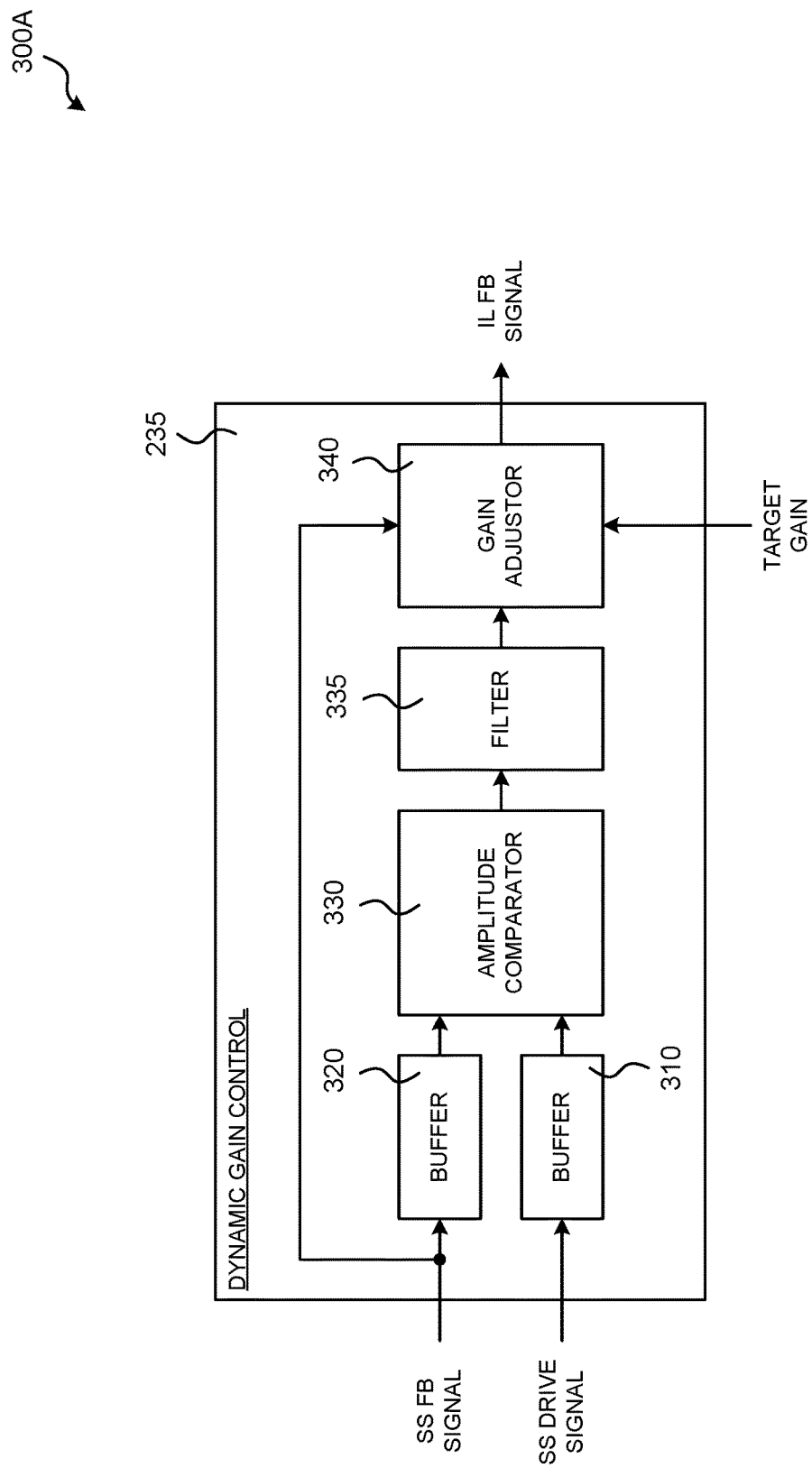
FIG. 3A shows a block diagram of an example dynamic gain controller for the inner control loop of a laser beam scanning display device.

FIG. 3A illustrates an example dynamic gain control block 235 that may be employed the laser beam scanning (LBS) display device 200 of FIG. 2. The example dynamic gain control block 235 of FIG. 3A includes a first buffer 310, a second buffer 320, an amplitude comparator 330, a gain adjustor block 340, and filter block 335.

The first buffer 310 is configured to receive and buffer the SS drive signal 232. The second buffer 320 is configured to receive and buffer the SS FB signal 233. The amplitude comparator 330 is configured to receive the output signals of the first and second buffers 310, 320, and generate a comparison output signal that corresponds to an amplitude comparison between the output signals of the first and second buffers 310, 320. The gain adjustor block 340 is configured to receive the SS FB signal 233, receive the output of the amplitude comparator 330, and adjust the gain of the IL FB signal 236 responsive to one or more of the SS FB signal 233 and the comparison output signal to achieve a target gain. The filter block 335 is an optional block that may be used to smooth out or dampen the output of the amplitude comparator to prevent an oscillation or overshoot in the gain adjustments from the dynamic gain control 235.

Figure 3B:
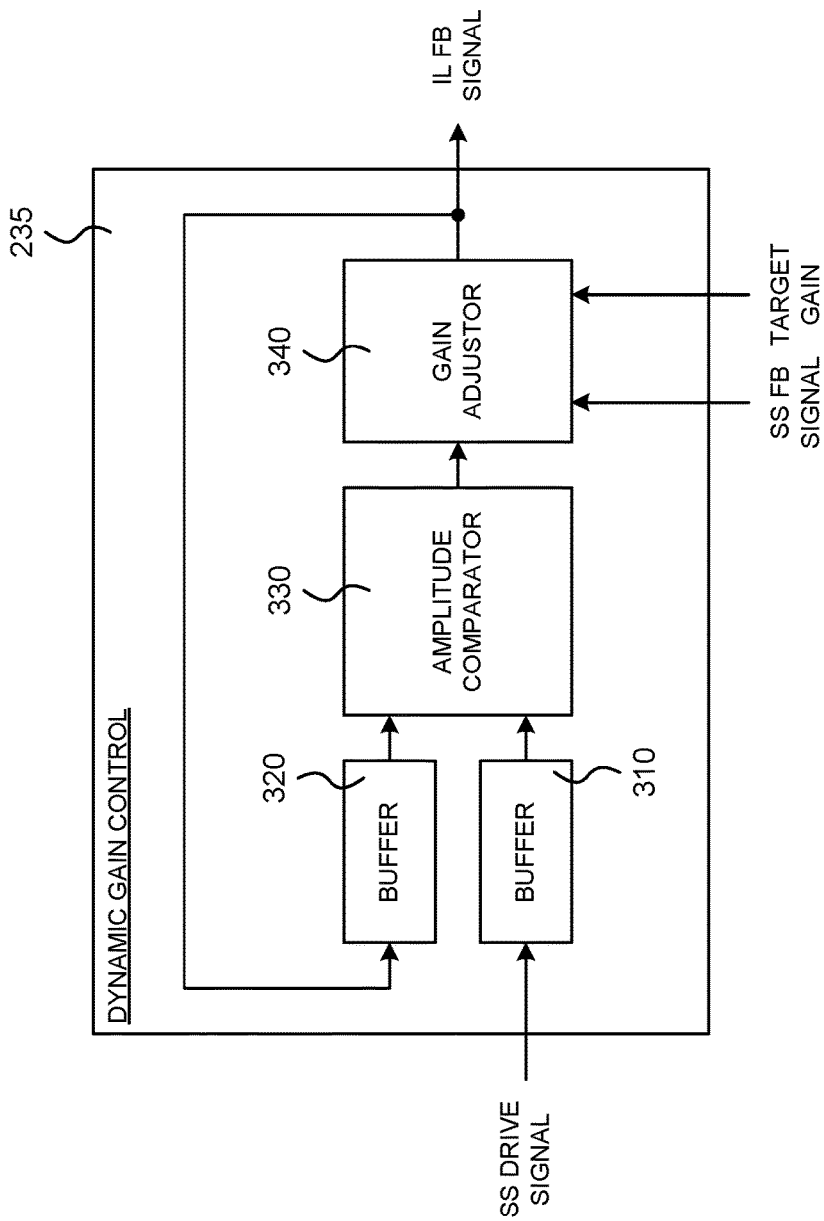
FIG. 3B shows a block diagram of another example dynamic gain controller for the inner control loop of a laser beam scanning display device.

FIG. 3B is substantially similar to FIG. 3A, with the exception of the second buffer 320 being configured to receive the IL FB signal 236 as an input instead of the SS FB signal 233. Thus, the amplitude comparator 220 in FIG. 3B is configured to compare the SS Drive signal 232 to the IL FB signal 236, and the gain adjustor 340 adjusts the gain of the IL FB signal 236 responsive to the comparison. In a general sense, each of the buffers 310, 320 buffers, or captures, a respective one of the signals input to the buffer, which is compared by the comparator, and the gain adjustor 340 adjusts a gain that is applied to the SS FB signal 233 to provide the IL FB signal 236.

The first and second buffers 310 and 320 are optional blocks that may not be required for many implementations. The buffers may be useful to aid in synchronous evaluation of the amplitudes according to a periodic rate of operation. For example, each buffer may be configured to selectively store their signals according to a periodic rate such that the amplitude comparator 330 has stable latched values to compare during each period of operation. In analog implementations, the buffer may include a sample and hold circuit, while in digital implementations the buffer may include a digital data buffer.

Additionally, detectors (not shown) may optionally be included between the buffers 310, 320 and the amplitude comparator 330. The detectors can be configured to detect a specific characteristic of the signal (e.g. a peak value of the signal, a max or min signal level, a slope of the signal, etc.), which may then be evaluated by the amplitude comparator 330. In other implementation, the buffers 310, 320 themselves may each be configured to detect the specific characteristic of their received signals. In still other implementations, the amplitude comparator 330 may be configured to detect the specific characteristic of the received signals.

The gain adjuster 340 may be implemented in a number of ways. In one example, the gain adjuster may be implemented with a logic block and a lookup table, where the output of the comparator 330 may be evaluated by the logic block to determine a gain adjustment to be made based on the detected difference between the SS FB signal and the SS Drive signal. In another example, the gain adjuster 340 may directly calculate the gain adjustment that is required to achieve the target gain. For example, the IL FB signal can be determined from the gain factor (GAIN) multiplied by the SS FB signal: IL FB=(SS FB)×(GAIN). The gain adjustor 340 may be configured to evaluate the target gain parameter (Target Gain). The actual loop gain can be determined from the SS FB signal and the SS Drive signal (e.g., Loop Gain=SS FB/SS Drive), which can then be compared to the Target Gain, which may correspond to the desired gain setting for the loop. The adjusted gain can then be determined as needing to be increased or decreased based on how far the measured value is from the desired gain setting. The adjusted gain may need to be divided by the loop gain in some examples.

By adjusting the gain of the IL FB signal in real time, the dynamic gain control block 235 of FIGS. 3A and 3B may be configured to dynamically adjust the gain of the inner control loop 230. In some examples, the gain adjustment may be executed in a continuous time fashion, while in other examples the gain adjustment may be executed at a periodic rate (e.g., 5 Hz, 10 Hz, 15 Hz, 20 Hz, 30 Hz, 60 Hz, 90 Hz, 120 Hz, etc.). The gain adjustment rate may be in any range of values that are acceptable to the overall system. For example, the range may be from a lower value to a higher value, where the lower value corresponds to one of about 5 Hz, 10 Hz, 15 Hz, 20 Hz, 30 Hz, 60 Hz, 90 Hz, etc.; the upper value corresponds to one of about 10 Hz, 15 Hz, 20 Hz, 30 Hz, 60 Hz, 90 Hz, 120 Hz, etc.; where the upper value is greater than the lower vale. By adjusting the gain of the inner-control loop a target gain can be achieved such that overall gain of the slow-scan mirror is compensated and stabilized.

In some embodiments, the periodic rate may be determined relative to some multiple number of frames for the LBS display. For example, the gain adjustment could occur once for each frame (e.g., frame rate X 1), once every other frame (e.g., frame rate X ½), once every third frame (e.g., frame rate/3, or x1/3), etc. The design may be any multiple of the frame rate for the LBS display device (x1, x1/2, x1/3, x1/4, x1/5, x1/10, . . . ), as long as the desired system performance requirements may be met. Such a periodic rate may have some benefits such as a damped response with reduced overshooting, preventing oscillation in the gain, etc.

In some additional embodiments, multiple frames may be averaged over an interval before a gain adjustment is made. For example, the gain adjustment could occur after the two frames are averaged (e.g., frame rate/2), an average of three frames (e.g., frame rate/3), etc. Again, the design is not limited and may average any number, as long as the desired system performance requirements may be met. In a specific example, the VPZR measurement values for the individual pixels may be averaged over multiple frames during an interval, where the gain adjustments are made using the averaged pixel values. The averaged values may be used to smooth out the gain adjustment and provide a damped response with reduced overshooting, preventing oscillation in the gain, etc.

In some examples, the signal characteristics evaluated by the dynamic gain control block 235 correspond to one or more of an amplitude, a maximum signal level, a minimum signal level, a slope, a mean slope, a median slope, a gain, a mean gain, or a median gain. The signal characteristics may also be represented as a frequency-domain spectral analysis. In some additional examples, the amplitude comparator is configured to compare one or more of a maximum signal level, a minimum signal level, an average or mean signal level, a median signal level, a gain, a peak gain, an average or mean gain, a median gain, or a quotient of any one of the characteristics.

In still further examples, the gain characteristics may be determined by a best linear fit calculation. For example, a portion of the SS FB signal for one display frame may be evaluated to find a best linear fit of the SS FB signal, and a portion of the drive signal may be similarly evaluated to find a best linear fit of the drive signal. A comparison between the two best linear fit curves may be made to determine if an adjustment needs to be made to achieve the desired target gain. In some examples, the comparison may be a calculation of the ratio of the slopes of the SS FB signal and the SS Drive signal, where an exact match would have a ratio of one, and a ratio of less than or greater than one indicates a gain change may be required to compensate.

In various examples, the comparator may be configured to compare digital values associated with the input signals and generate a difference calculation that has one or more of a magnitude and a polarity. The polarity of the difference may indicate if the direction of the loop gain adjustment, e.g. increase or decrease, while the magnitude of the difference may indicate a proportional amount of adjustment required to the loop gain.

By comparing the amplitude of the characteristics of the signals before and after the MEMS assembly, the control loop can automatically adapt and compensate for variations in gains caused by the MEMS assembly and the related drive and sense circuits, as well as any other system based variations in gain. As previously discussed, these variations in gain can be the result of age, operating conditions (e.g., temperature, humidity, vibration) as well as manufacturing variations.

Figure 4A:
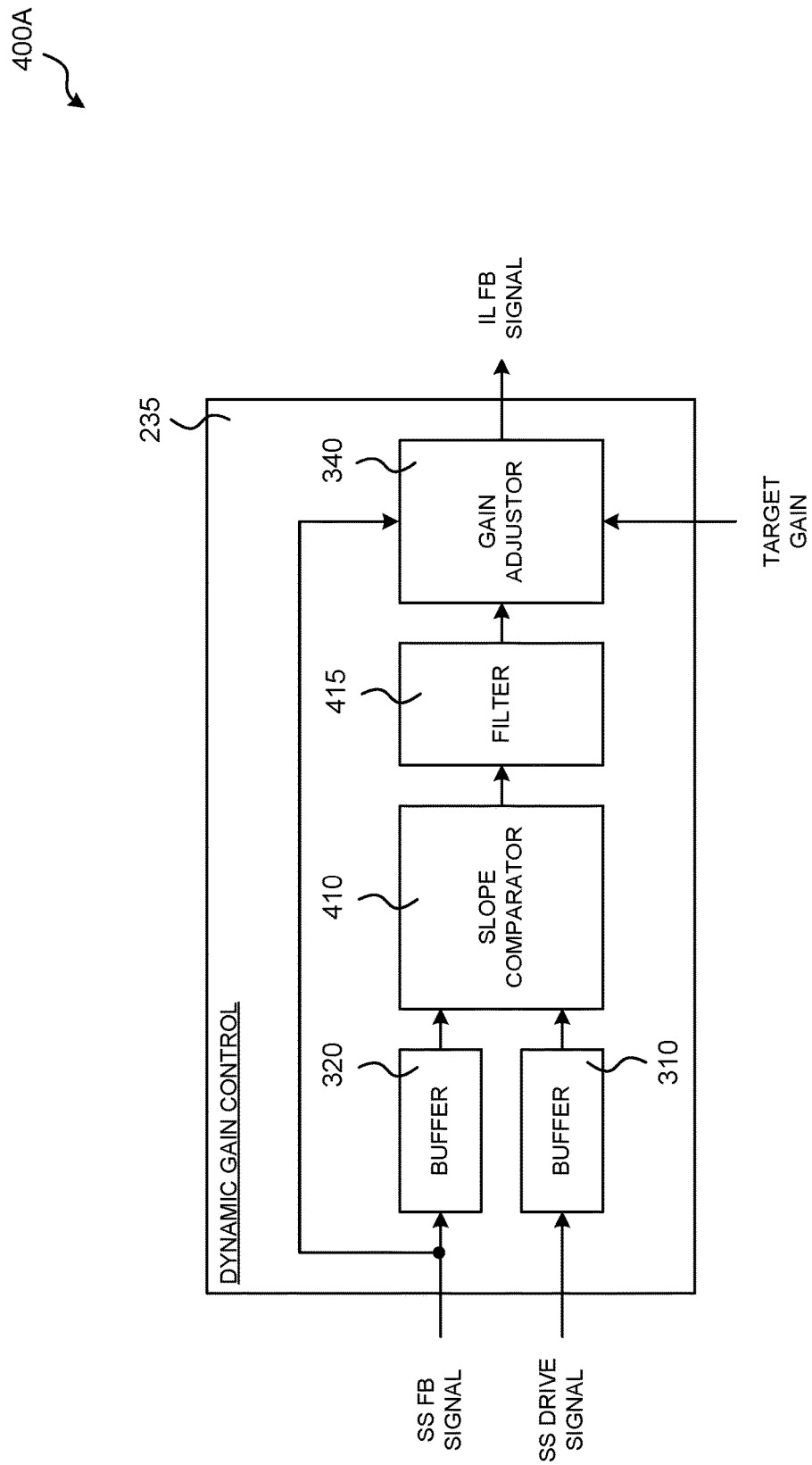
FIG. 4A shows a block diagram of yet another example dynamic gain controller for the inner control loop of a laser beam scanning display device.

FIG. 4A illustrates another example dynamic gain control block 235 that may be employed the laser beam scanning (LB S) display device 200 of FIG. 2. The example dynamic gain control block 235 of FIG. 4A includes a first buffer 310, a second buffer 320, a slope comparator 410, a gain adjustor block 340, and filter block 415.

The first buffer block 310 is configured to receive and buffer the SS drive signal 232, while the second gain detector block 320 is configured to receive and buffer the SS FB signal 233. The slope comparator 410 is configured to receive the outputs of the first and second buffer blocks 310, 320, and generate a comparison output signal that is responsive to a comparison between the slope characteristics of the output signals of the first and second buffers 310, 320. The gain adjustor block 340 is configured to receive the SS FB signal 233, receive the output of the slope comparator 410, and adjust the gain of the IL FB signal 236 responsive to one or more of the SS FB signal 233 and the comparison output signal to achieve a target gain. The filter block 415 is an optional block that may be used to smooth out or dampen the output of the slope comparator to prevent an oscillation or overshoot in the gain adjustments from the dynamic gain control 235.

Figure 4B:
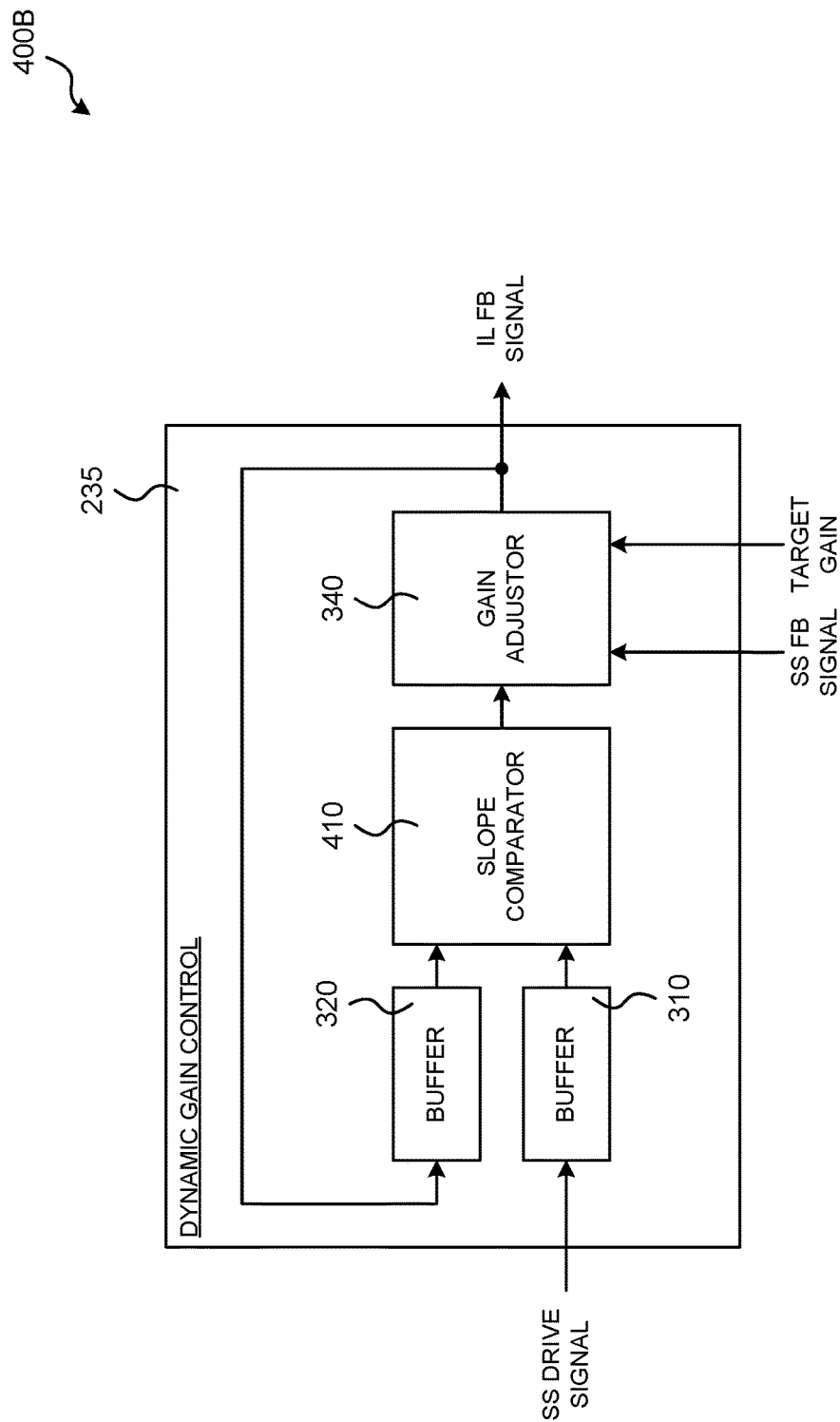
FIG. 4B shows a block diagram of still another example dynamic gain controller for the inner control loop of a laser beam scanning display device.

FIG. 4B is substantially similar to FIG. 4A, with the exception of the second buffer 320 being configured to receive the IL FB signal 236 as an input instead of the SS FB signal 233. Thus, the slope comparator 410 in FIG. 4B is configured to compare the SS Drive signal 232 to the IL FB signal 236, and the gain adjustor 340 adjusts the gain of the IL FB signal 236 responsive to the comparison. In a general sense, each of the buffers 310, 320 buffers, or captures, a respective one of the signals input to the buffer, which is compared by the comparator, and the gain adjustor 340 adjusts a gain that is applied to the SS FB signal 233 to provide the IL FB signal 236.

As stated previously, the first and second buffers 310 and 320 are optional blocks that may not be required for many implementations. The buffers may be useful to aid in synchronous evaluation of the slopes according to a periodic rate of operation. For example, each buffer may be configured to selectively store their signals according to a periodic rate such that the slope comparator 410 has stable latched values to compare during each period of operation. In analog implementations, the buffer may include a sample and hold circuit, while in digital implementations the buffer may include a digital data buffer.

Additionally, detectors (not shown) may optionally be included between the buffers 310, 320 and the slope comparator 410. The detectors can be configured to detect a specific characteristic of the signal (e.g. a peak value of the signal, a max or min signal level, a slope of the signal, etc.), which may then be evaluated by the slope comparator 410. In other implementation, the buffers 310, 320 themselves may each be configured to detect the specific characteristic of their received signals. In still other implementations, the slope comparator 410 may be configured to detect the specific characteristic of the received signals.

The gain adjuster 340 may be implemented in a number of ways. In one example, the gain adjuster may be implemented with a logic block and a lookup table, where the output of the comparator 330 may be evaluated by the logic block to determine a gain adjustment to be made based on the detected difference between the SS FB signal and the SS Drive signal. In another example, the gain adjuster 340 may directly calculate the gain adjustment that is required to achieve the target gain. For example, the IL FB signal can be determined from the gain factor (GAIN) multiplied by the SS FB signal: IL FB=(SS FB)×(GAIN). The gain adjustor 340 may be configured to evaluate the target gain parameter (Target Gain). The actual loop gain can be determined from the SS FB signal and the SS Drive signal (e.g., Loop Gain=SS FB/SS Drive), which can then be compared to the Target Gain, which may correspond to the desired gain setting for the loop. The adjusted gain can then be determined as needing to be increased or decreased based on how far the measured value is from the desired gain setting. The adjusted gain may need to be divided by the loop gain in some examples.

By adjusting the gain of the IL FB signal in real time, the dynamic gain control block 235 of FIGS. 4A and 4B are configured to dynamically adjust the gain of the inner control loop 230. In some examples, the gain adjustment may be executed in a continuous time fashion, while in other examples the gain adjustment may be executed at a periodic rate (e.g., 10 Hz, 15 Hz, 30 Hz, 60 Hz, 90 Hz, etc.). By adjusting the gain of the inner-control loop a target gain can be achieved, thereby compensating for gain variations in the system that may be due to manufacturing variations changes in the slow-scan mirror, drive circuits, as well as any other system based gain variation.

In some examples, the signal characteristics correspond to one or more of a slope, a maximum slope, a minimum slope, a mean slope, a median slope, or a best fit slope. In some additional examples, the slope comparator is configured to compare one or more of a slope, a maximum slope, a minimum slope, a mean slope, a median slope, or a best fit slope, or a quotient of any one of the characteristics.

By detecting and comparing the slope of the signals before and after the MEMS assembly, the control loop can automatically adapt and compensate for variations in gains caused by the MEMS assembly and the related drive and sense circuits, as well as any other system based gain variations. The slope can be determined by various means such as a linear fit to at least a portion of the VPZR data (the data captured from the SS Mirror). As previously discussed, these variations in gain can be the result of age, operating conditions (e.g., temperature, humidity, vibration) as well as manufacturing-based variations.

In some examples, a frame of the drive signal and a frame of the feedback signal can be captured by the first and second buffers 310, 320. The captured drive signal data can be evaluated to identify a first slope, which may correspond the slope of the ramp signal that drives the display. The captured feedback signal can be evaluated to identify a second slope, which corresponds to the slope of the VPZR data, which also indicates a measured response of the MEMS mirror to the drive signal. These slopes may be determined by a linear fit of at least a portion of their respective captured data. A difference in the first and second slopes indicate an error or mismatch in the gain between the drive signal and the MEMS mirror response, which can then be used to adjust the inner control loop gain. For example, a magnitude of the difference can be used to identify an amount to adjust the loop gain, and a polarity of the difference can be used to determine if the loop gain is increased or decreased.

FIG. 5 illustrates another example dynamic gain control block 235 that may be employed the laser beam scanning (LB S) display device 200 of FIG. 2. The example dynamic gain control block 235 of FIG. 5 includes a first buffer 310, a second buffer 320, one or more comparator blocks 330, 410, 510, a gain adjustor block 340, and filter blocks 335, 415, and 515.

The one or more comparator blocks may be any desired comparator function, including but not limited to an amplitude comparator 330, a slope comparator 410, or a spectral comparator 510. The first buffer block 310 is configured to receive and buffer the SS drive signal 232. The second buffer block 320 is configured to receive and buffer the SS FB signal 233.

The amplitude comparator 330 is configured to receive the output signals of the first and second buffer blocks 310, 320, and generate a comparator output signal that is responsive to an amplitude comparison between the signals. The slope comparator 410 is configured to receive the output signals of the first and second buffer blocks 310, 320, and generate a comparator output signal that is responsive to a slope comparison between the signals. The spectral comparator 510 is configured to receive the output signals of the first and second buffer blocks 310, 320, and generate a comparator output signal that is responsive to a spectral comparison between the signals.

Figure 5A:
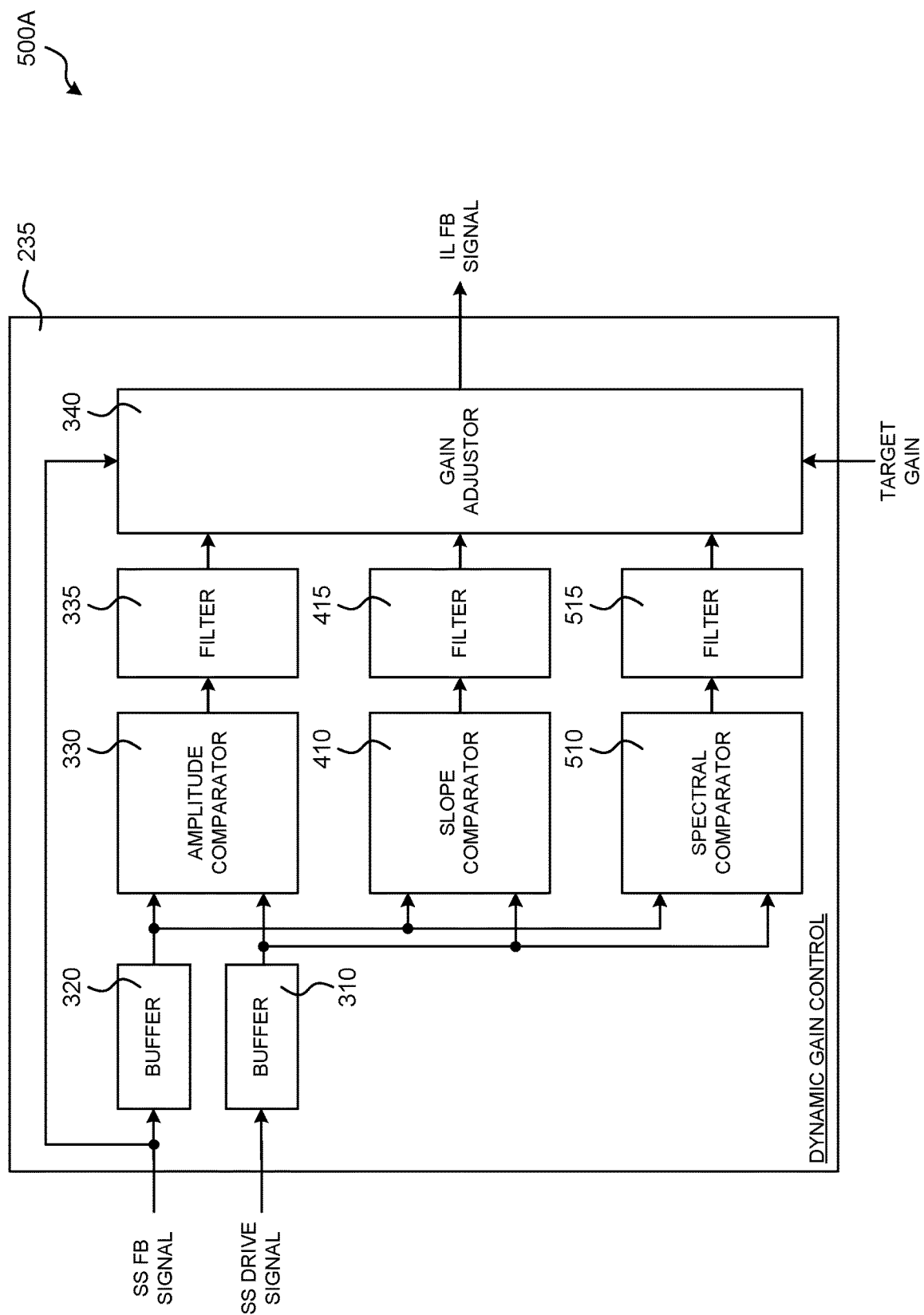
FIG. 5A shows a block diagram of yet still another example dynamic gain controller for the inner control loop of a laser beam scanning display device.
Figure 5B:
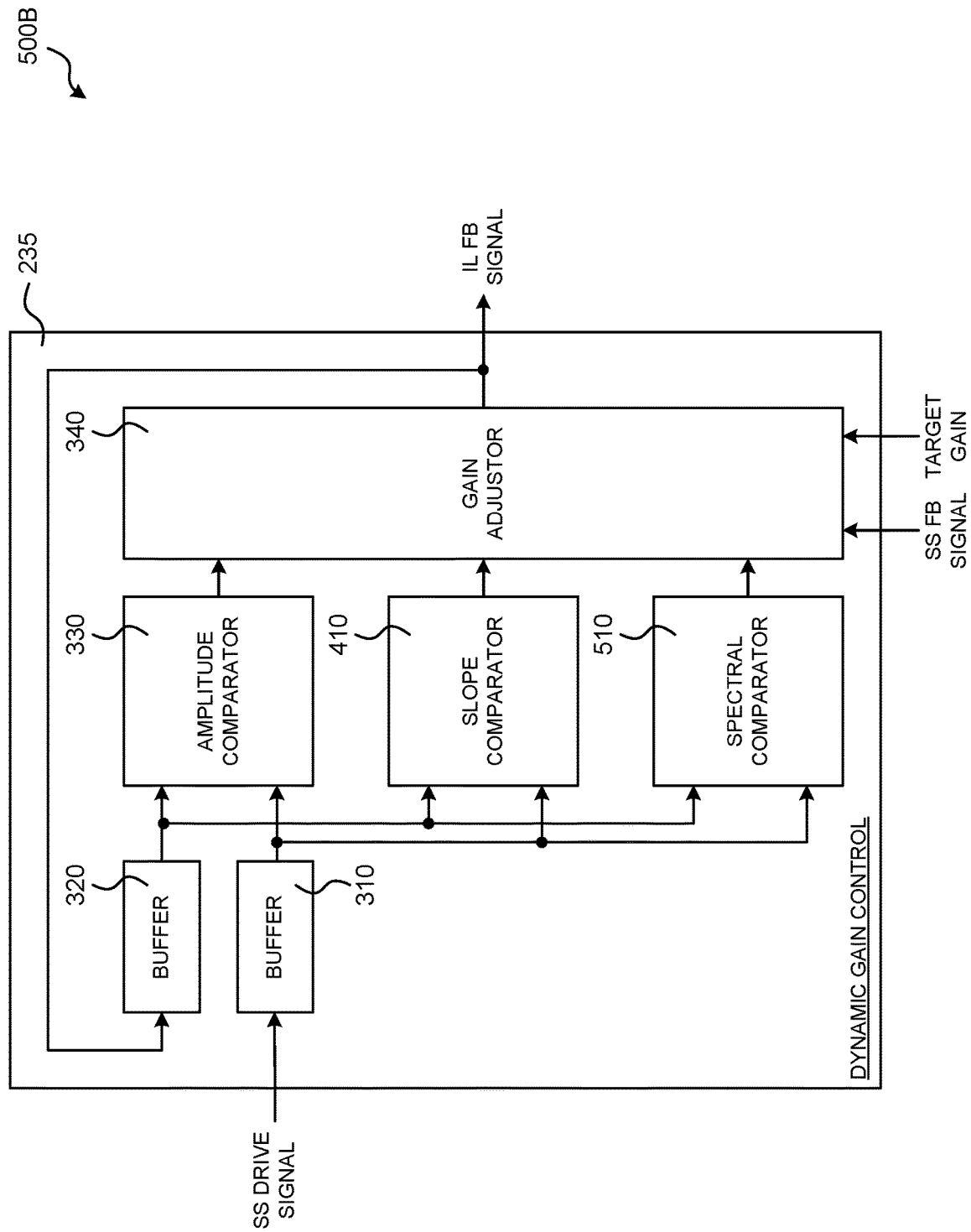
FIG. 5B shows a block diagram of still yet another example dynamic gain controller for the inner control loop of a laser beam scanning display device.

As stated previously, the first and second buffers 310 and 320 are optional blocks that may not be required for many implementations. Additionally, detectors (not shown) may optionally be included between the buffers 310, 320 and the comparators 330, 410, 510. The detectors can be configured to detect a specific characteristic of the signal (e.g. a peak value of the signal, a max or min signal level, a slope of the signal, etc.), which may then be evaluated by a respective one of the comparators. In other implementation, the buffers 310, 320 themselves may each be configured to detect the specific characteristics of their received signals. In still other implementations, the comparators 310, 410, 510 may be configured to detect the specific characteristics of the received signals. The filter blocks are optional blocks that may be used to smooth out or dampen the output of the comparators 330, 410, 510 to prevent an oscillation or overshoot in the gain adjustments from the dynamic gain control 235. FIG. 5B is substantially similar to FIG. 5A, with the exception of the second buffer 320 being configured to receive the IL FB signal 236 as an input instead of the SS FB signal 233. Thus, the comparators 330, 410 and 510 in FIG. 4B are configured to compare the SS Drive signal 232 to the IL FB signal 236, and the gain adjustor 340 adjusts the gain of the IL FB signal 236 responsive to the comparison. In a general sense, each of the buffers 310, 320 buffers, or captures, a respective one of the signals input to the buffer, which is compared by the comparators, and the gain adjustor 340 adjusts a gain that is applied to the SS FB signal 233 to provide the IL FB signal 236.

The gain adjustor block 340 is configured to receive the SS FB signal, receive one or more of the comparator output signals, and adjust the gain of the IL FB signal 236 responsive to one or more of the SS FB signal and the comparison signal(s) to achieve a target gain. By adjusting the gain of the IL FB signal in real time, the dynamic gain control block 235 of FIGS. 5A and 5B are configured to dynamically adjust the gain of the inner control loop 230 to achieve the target gain.

In some examples, the gain adjustment may be executed in a continuous time fashion, while in other examples the gain adjustment may be executed at a periodic rate (e.g., 10 Hz, 15 Hz, 30 Hz, 60 Hz, 90 Hz, etc.). By adjusting the gain of the inner control loop a target gain can be achieved such that gain variations are compensated and stabilized. In various examples, the characteristics of the signals that are evaluated by the comparators to determine a gain adjustment may correspond to one or more of a slope, an amplitude, a spectral component, or combinations of amplitudes, slopes, or spectral components, including but not limited to a maximum, a minimum, a mean, a median, a best fit, or a quotient related to the characteristics.

The gain adjuster 340 may be implemented in a number of ways. In one example, the gain adjuster may be implemented with a logic block and a lookup table, where the output of the comparator 330 may be evaluated by the logic block to determine a gain adjustment to be made based on the detected difference between the SS FB signal and the SS Drive signal. In another example, the gain adjuster 340 may directly calculate the gain adjustment that is required to achieve the target gain. For example, the IL FB signal can be determined from the gain factor (GAIN) multiplied by the SS FB signal: IL FB=(SS FB)×(GAIN). The gain adjustor 340 may be configured to evaluate the target gain parameter (Target Gain). The actual loop gain can be determined from the SS FB signal and the SS Drive signal (e.g., Loop Gain=SS FB/SS Drive), which can then be compared to the Target Gain, which may correspond to the desired gain setting for the loop. The adjusted gain can then be determined as needing to be increased or decreased based on how far the measured value is from the desired gain setting. The adjusted gain may need to be divided by the loop gain in some examples.

By comparing one or more of the amplitude, slope or spectral content characteristics of the signals before and after the MEMS assembly, the control loop can automatically adapt and compensate for variations in gains caused by the MEMS assembly and the related driver and sense circuits. As previously discussed, these variations in gain can be the result of age, operating conditions (e.g., temperature, humidity, vibration, etc.) as well as manufacturing variations, or any other gain variation.

Figure 6A:
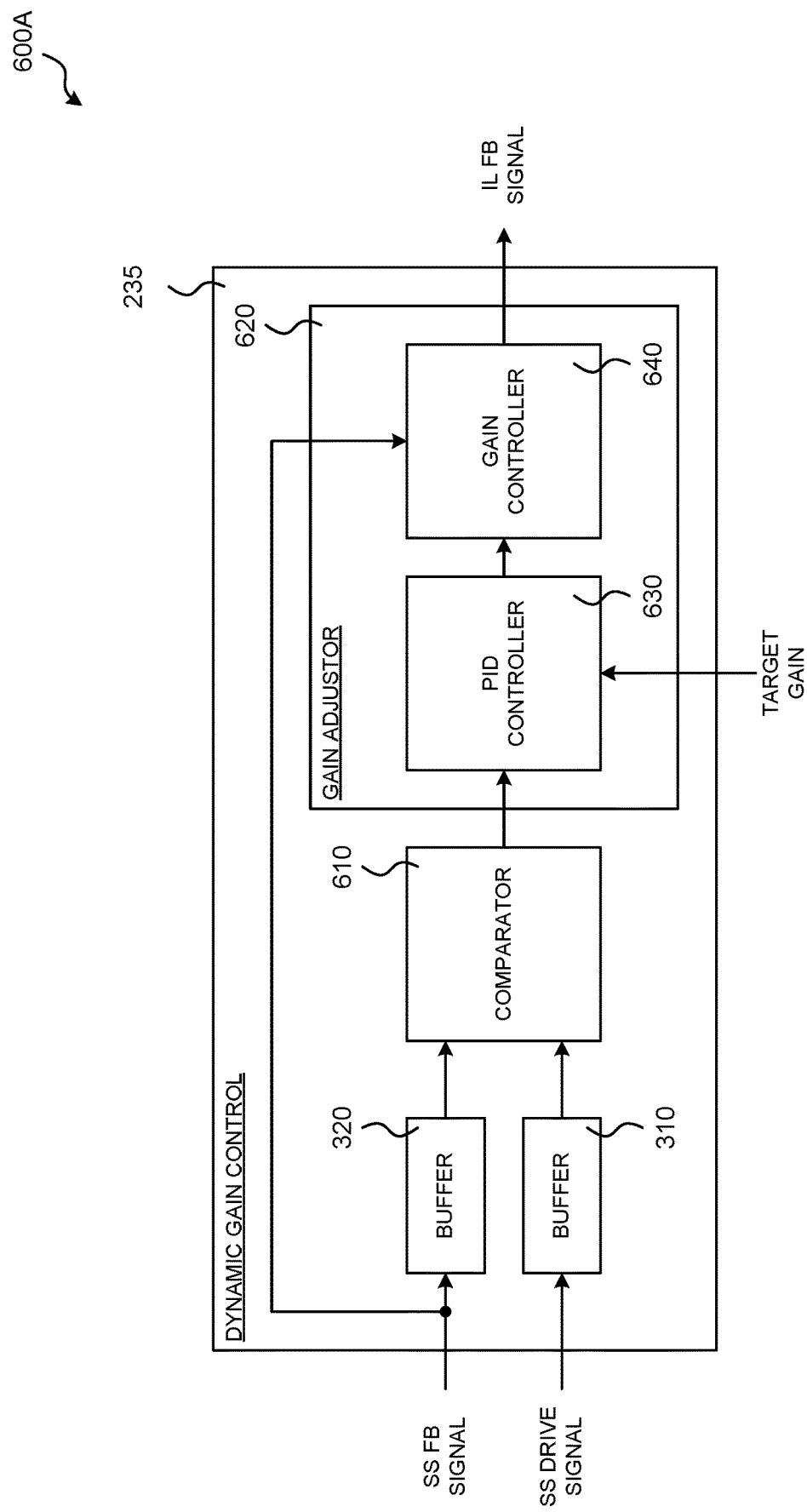
FIG. 6A shows a block diagram of an example dynamic gain controller for the inner control loop of a laser beam scanning display device.

FIG. 6A illustrates an example dynamic gain control block 235 that may be employed the laser beam scanning (LBS) display device 200 of FIG. 2. The example dynamic gain control block 235 of FIG. 6A includes a first buffer 310, a second buffer 320, a comparator 610, and a gain adjustor block 620.

The first buffer block 310 is configured to receive and buffer the SS drive signal 232, while the second block block 320 is configured to receive and buffer the SS FB signal 233. The comparator 610 is configured to receive the output signals of the first and second buffer blocks 310, 320, and generate a comparison output signal that is responsive to a comparison between one or more characteristics of the signals. The comparison output signal is received by the gain adjustor block 620, along with the SS FB signal, which is configured to adjust the gain of the IL FB signal 236 based on the comparison to achieve a target gain.

As stated previously, the first and second buffers 310 and 320 are optional blocks that may not be required for many implementations. Additionally, detectors (not shown) may optionally be included between the buffers 310, 320 and the comparator 610. The detectors can be configured to detect a specific characteristic of the signal (e.g. a peak value of the signal, a max or min signal level, a slope of the signal, etc.), which may then be evaluated by the comparator 610. In other implementation, the buffers 310, 320 themselves may each be configured to detect the specific characteristic of their received signals. In still other implementations, the comparator 610 may be configured to detect the specific characteristic of the received signals.

Figure 6B:
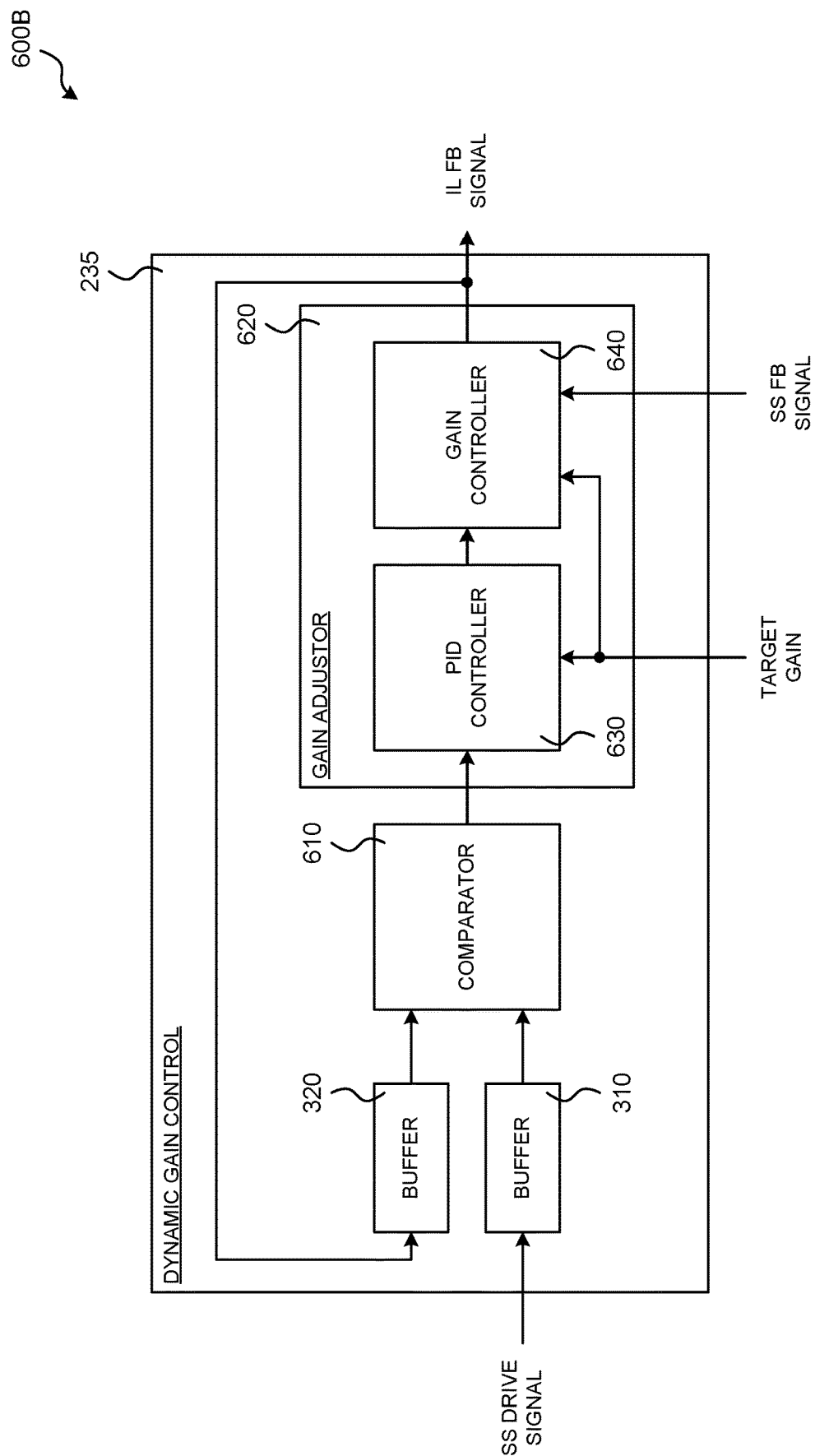
FIG. 6B shows a block diagram of another example dynamic gain controller for the inner control loop of a laser beam scanning display device.

FIG. 6B is substantially similar to FIG. 6A, with the exception of the second buffer 320 being configured to receive the IL FB signal 236 as an input instead of the SS FB signal 233. Thus, the comparators 330, 410 and 510 in FIG. 4B are configured to compare the SS Drive signal 232 to the IL FB signal 236, and the gain adjustor 340 adjusts the gain of the IL FB signal 236 responsive to the comparison. In a general sense, each of the buffers 310, 320 buffers, or captures, a respective one of the signals input to the buffer, which is compared by the comparators, and the gain adjustor 620 adjusts a gain that is applied to the SS FB signal 233 to provide the IL FB signal 236.

For the example of FIGS. 6A and 6B, the gain adjustor block 620 includes one or more proportional-integral-derivative (PID) controllers 630 and a gain controller 640. Each PID controller is a three-term controller, that includes three different coefficients (one for proportion, one of integral, and one for differential) that can be adjusted to adapt the controller for the desired control topology to achieve the target gain as the set point. The PID controller(s) receive the output(s) of the comparator 610, which may indicate an error in gain, and determines if the feedback signals to the controller need to be adjusted to achieve a gain target.

PID controllers continuously calculate an error value, e(t), which corresponds to a difference between a desired set point, r(t), and a measured process variation, y(t). Thus, the error value e(t) may be given as e(t)=r(t)−y(t). The PID controller is typically configured to provide an output signal (sometimes called a correction signal), u(t), that is based on the error value, e(t), using a set of proportional, integral, and derivative coefficients (denoted $K_P$, $K_I$, and $K_D$ respectively). The correction signal, u(t), for a PID controller can generally be given as:

$$u(t) = K_P e(t) + K_I \int_0^t e(t)dt + K_D \frac{de(t)}{dt} \tag{EQ. 1}$$

The proportional (P) term in this equation, $K_P$+e(t), is proportional to the current value of the error from the set point, e(t), times the gain scaling factor set by the coefficient $K_P$. When there is no error, e(t)=0 and there is no corrective response. The integral (I) term accounts for past values of the error, e(t), integrated or accumulated over time. For example, when there is a residual error after the application of the proportional (P) control term, (e.g., an error that may lag in time after the new P term is applied), the integral term counteracts this residual error by adding a control term for the cumulative value of the error over a time interval, gain scaled by the coefficient $K_I$. When the error e(t) reaches zero, the integral term will cease to grow since no additional error will accumulate. The differential (D) term corresponds to an estimate of the error, based on the rate of change of the error over time, gain scaled by the coefficient $K_D$. For a rapid change in error, the damping applied by the differential term will be greater. The tuning of the coefficients ($K_P$, $K_I$, $K_D$) can be determined using any variety of tuning methods, manual or algorithmic, that consider the output of the SS mirror (e.g., the SS FB signal), the gain needed for the system, along with any other parameters such as update rate, frame rate of the LBS device, etc.

In one example, a system parameter the set point, r(t), may correspond to the current target gain setting of the system, and the error signal, e(t), may correspond to the error or difference in the currently detected gain of the SS mirror (based on slope, amplitude, ratio, etc.). In this example, the PID controller may apply the coefficients ($K_P$, $K_I$, $K_D$) to these conditions and output a signal, u(t), which may correspond to a feedback scaling factor to be combined with overall gain of the feedback loop. Thus, for example, the gain controller block 640 receives the gain correction factor from the PID controller 630, multiplies it with any other gain adjustment terms, and the SS FB signal 233 (which is the output of the SS mirror 220), and the product is used as feedback signal IL FB of the SS inner loop.

An illustrative example adaptive process with the PID controller, may be illustrated as follows. The PZT gain drops from 100% to 93% of original. The signal before the SS mirror (e.g., the SS drive signal 232) does not change, while the signal after the SS mirror 220 (e.g., the VPZR data from 222) changes. The gain detectors detect the gain variations through amplitude/slope comparisons. The PID takes in the gain variations and compares it with the target gain, and the PID then output the gain correcting signals to the gain adjustor block. The adjustable gain block outputs the gain and the loop gain gradually increases to compensate for the PZT gain drop. The gain control loop continues running until the inner loop gain reaches the desired target gain.

FIGS. 7A-11 show flowcharts of example methods that illustrate aspects of dynamic gain adjustments for example control systems with adaptive inner loop gain compensation. In the various example methods described herein, the gain adjustments will compensate for gain variations to achieve a target gain. The gain variations may occur in any portion of the system, including but not limited to slow-scan mirror. As described previously, the gain variations may occur from manufacturing variations, operational age or use, and/or operating environmental conditions such as temperature, humidity or vibrations.

It should be appreciated that the particular implementation of the technologies disclosed herein is a matter of choice dependent on the performance and other requirements of the computing device. Accordingly, the logical operations described herein are referred to variously as states, operations, structural devices, acts, or modules.

These states, operations, structural devices, acts and modules can be implemented in hardware, software, firmware, in special-purpose digital logic, and any combination thereof. It should be appreciated that more or fewer operations can be performed than shown in the FIGS. and described herein. These operations may also be performed in a different order than those described herein, and in many instances, operations may be performed in parallel.

Figure 7A:
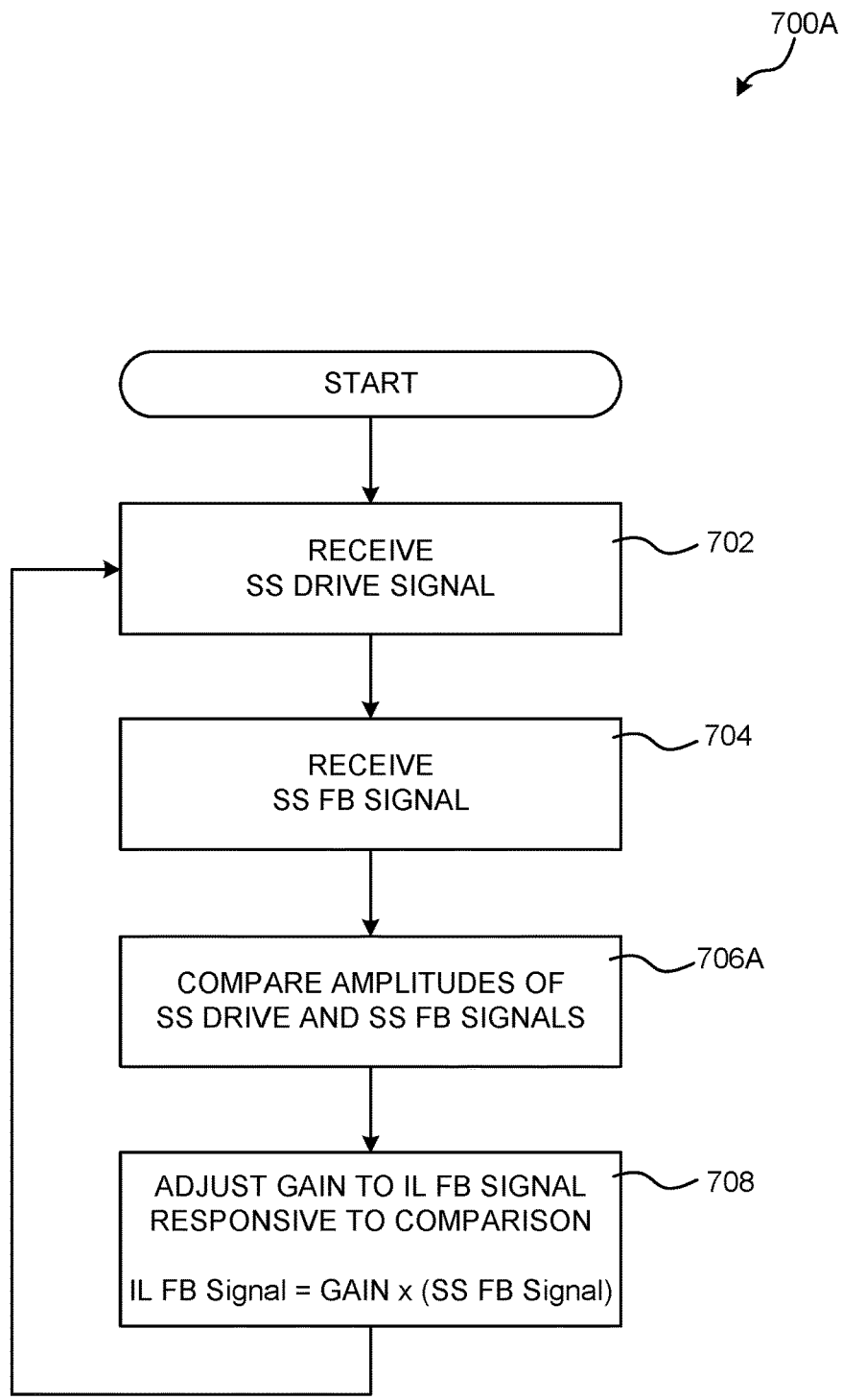
FIG. 7A shows a flowchart of an example method to adjust a feedback signal of the inner control loop to compensate the gain for the slow-scan mirror of a laser beam scanning display device.

FIG. 7A shows a flowchart of an example method 700A to adjust a feedback signal of the inner control loop to compensate the gain for the slow-scan mirror of a laser beam scanning display device. Aspects of method 700A may refer to the example dynamic gain adjustments described above with reference to FIGS. 1, 2, 3A, 4A, 5A, and 6A. Method 700A begins at operation 702, where the dynamic gain control block 235 receives the SS drive signal 232. Method 700A proceeds from operation 702 to operation 704, where the dynamic control block 235 receives the SS FB signal 233 from the SS mirror 220. Method 700A proceeds from operation 704 to operation 706A, where the dynamic control block 235 compares the amplitude of the SS drive signal 232 and the SS FB signal 233 from the SS mirror 220. Method 700A proceeds from operation 706A to operation 708, where the dynamic control block 235 adjusts the IL FB signal 236 responsive to at least the comparison from operation 706. Since the IL FB signal 236 is part of the inner control loop of controller 210, the gain of the inner-control loop is effectively adjusted to achieve a target gain for the laser beam scanning display device.

Figure 7B:
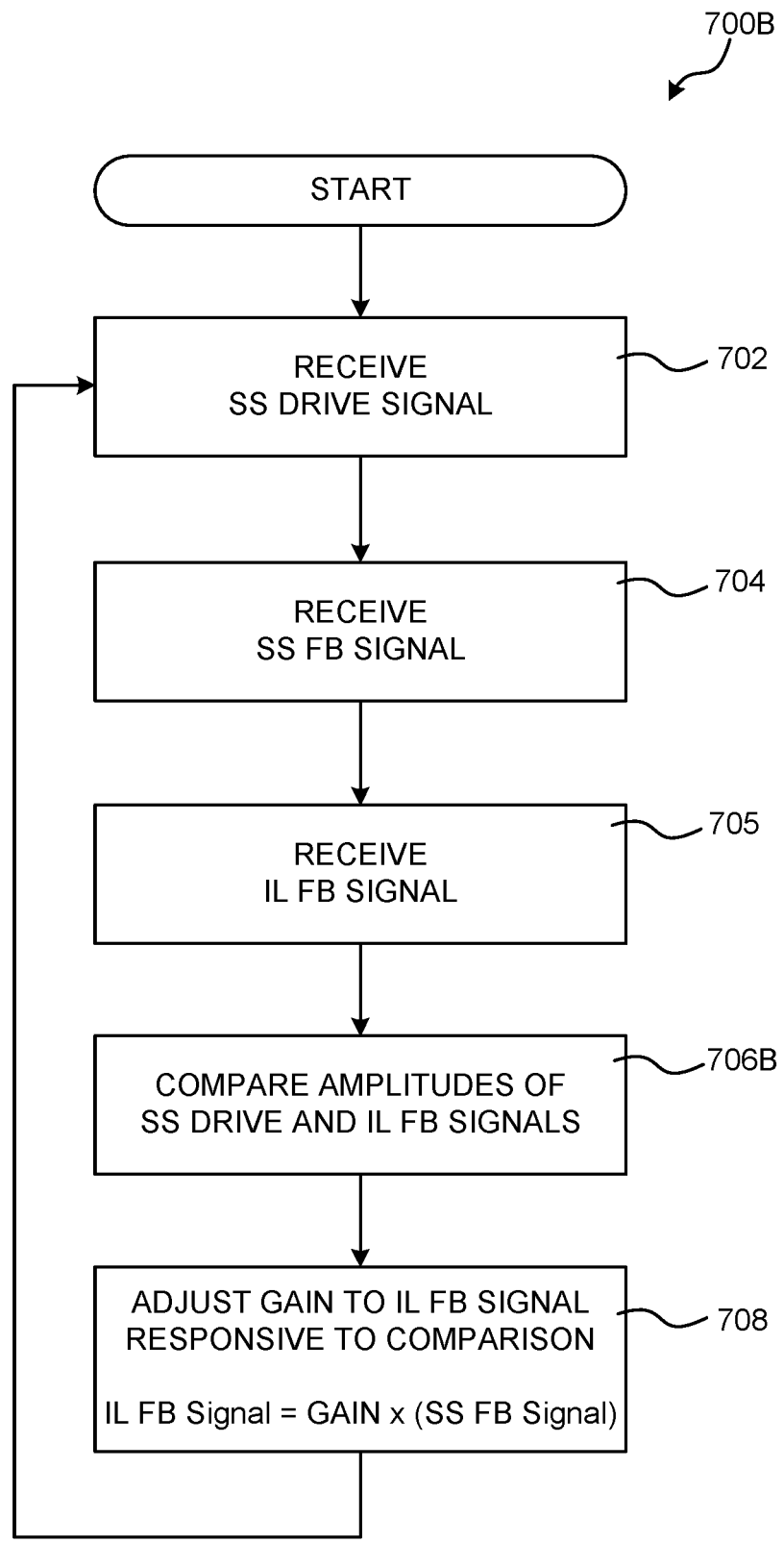
FIG. 7B shows a flowchart of another example method to adjust a feedback signal of the inner control loop to compensate the gain for the slow-scan mirror of a laser beam scanning display device.

FIG. 7B shows a flowchart of another example method 700B to adjust a feedback signal of the inner control loop to compensate the gain for the slow-scan mirror of a laser beam scanning display device. Aspects of method 700B may refer to the example dynamic gain adjustments described above with reference to FIGS. 1, 2, 3B, 4B, 5B, and 6B. Method 700B begins at operation 702, where the dynamic gain control block 235 receives the SS drive signal 232. Method 700B proceeds from operation 702 to operation 704, where the dynamic control block 235 receives the SS FB signal 233 from the SS mirror 220. Method 700B proceeds from operation 704 to operation 705, where the dynamic control block 235 receives the IL FB signal 236. Method 700B proceeds from operation 705 to operation 706B, where the dynamic control block 235 compares the amplitude of the SS drive signal 232 and the IL FB signal 236. Method 700B proceeds from operation 706B to operation 708, where the dynamic control block 235 adjusts the IL FB signal 236 responsive to at least the comparison from operation 706B. Since the IL FB signal is part of the inner control loop of controller 210, the gain of the inner-control loop is effectively adjusted to achieve a target gain for the laser beam scanning display device.

Additional steps may be applied at block 708 in methods 700A and 700B to limit the gain adjustment and/or to limit the signal levels as previously discussed. Moreover, the measured amplitudes of the signals from blocks 706A and 706B may be evaluated to determine a measured gain (e.g., gain may be related to amplitude difference, amplitude ratio, etc.), which can then be compared to the target gain to determine the amount of gain adjustment required. In one example, the gain applied to the SS FB signal 233 at block 708 may be given as: IL FB=(GAIN)×(SS FB).

The received signals and amplitude comparison operations for methods 700A and 700B may be accomplished by any appropriate method, including both analog or digital solutions. Various operations of methods 700A and 700B may be done in parallel. For example, operations 702 and 704 and/or 705 may be performed substantially in parallel. Additionally, as previously described above, the feedback signal adjustment operation may be done continually, periodically, or using averaged values over a given period. Moreover, the amplitude comparison operations of methods 700A and 700B may be done by any appropriate method responsive to characteristics of the received signals.

Figure 8A:
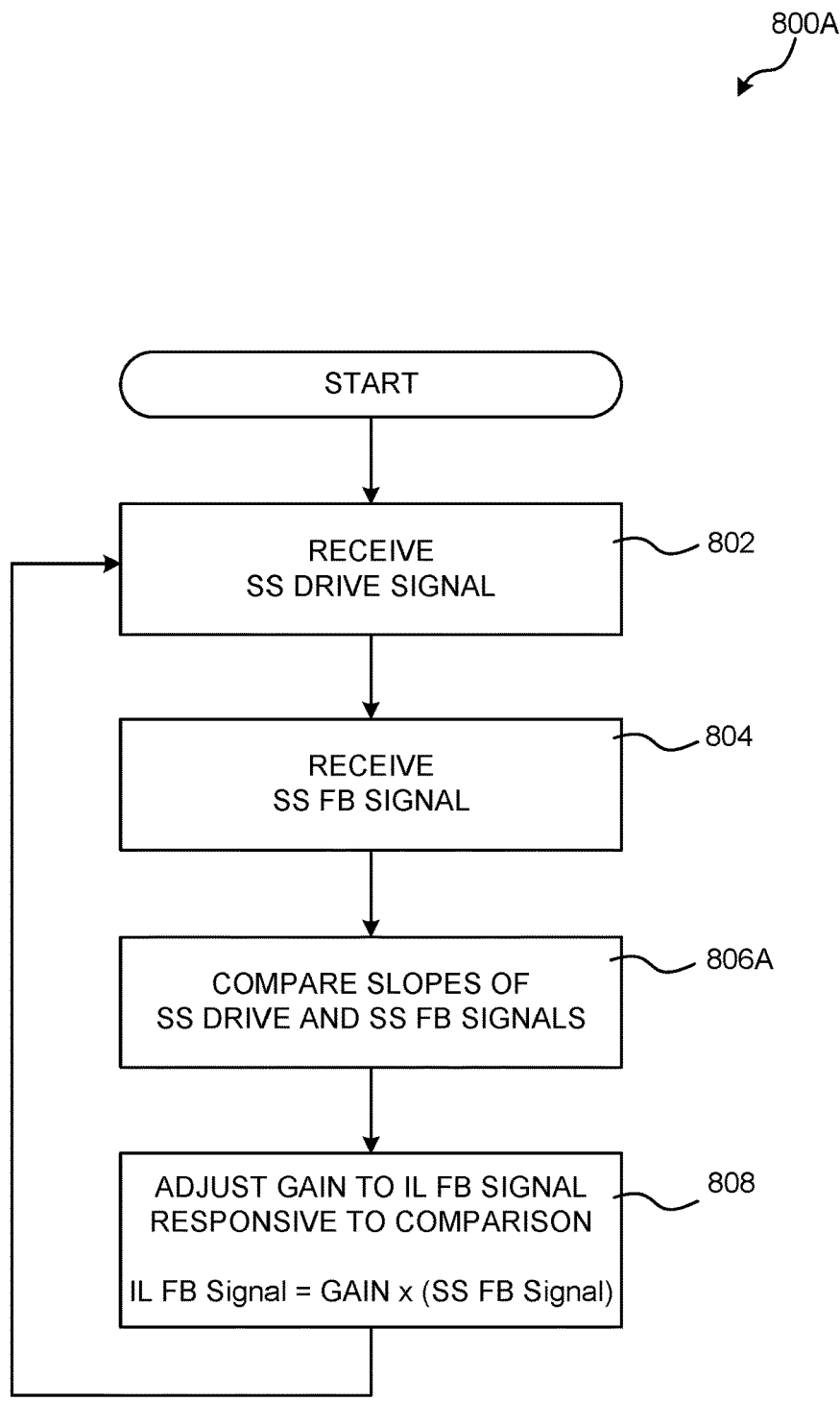
FIG. 8A shows a flowchart of still another example method to adjust a feedback signal of the inner control loop to compensate the gain for the slow-scan mirror of a laser beam scanning display device.

FIG. 8A shows a flowchart of an example method 800A to adjust a feedback signal of the inner control loop to compensate the gain for the slow-scan mirror of a laser beam scanning display device. Aspects of method 800A may refer to the example dynamic gain adjustments described above with reference to FIGS. 1, 2, 3A, 4A, 5A, and 6A. Method 800A begins at operation 802, where the dynamic gain control block 235 receives the SS drive signal 232. Method 800A proceeds from operation 802 to operation 804, where the dynamic control block 235 receives the SS FB signal 233 from the SS mirror 220. Method 800A proceeds from operation 804 to operation 806A, where the dynamic control block 235 compares the slope of the SS drive signal 232 and the SS FB signal 233 from the SS mirror 220. Method 800A proceeds from operation 806A to operation 808, where the dynamic control block 235 adjusts the IL FB signal 236 responsive to at least the comparison from operation 806. Since the IL FB signal is part of the inner control loop of controller 210, the gain of the inner-control loop is effectively adjusted to achieve a target gain for the laser beam scanning display device.

Figure 8B:
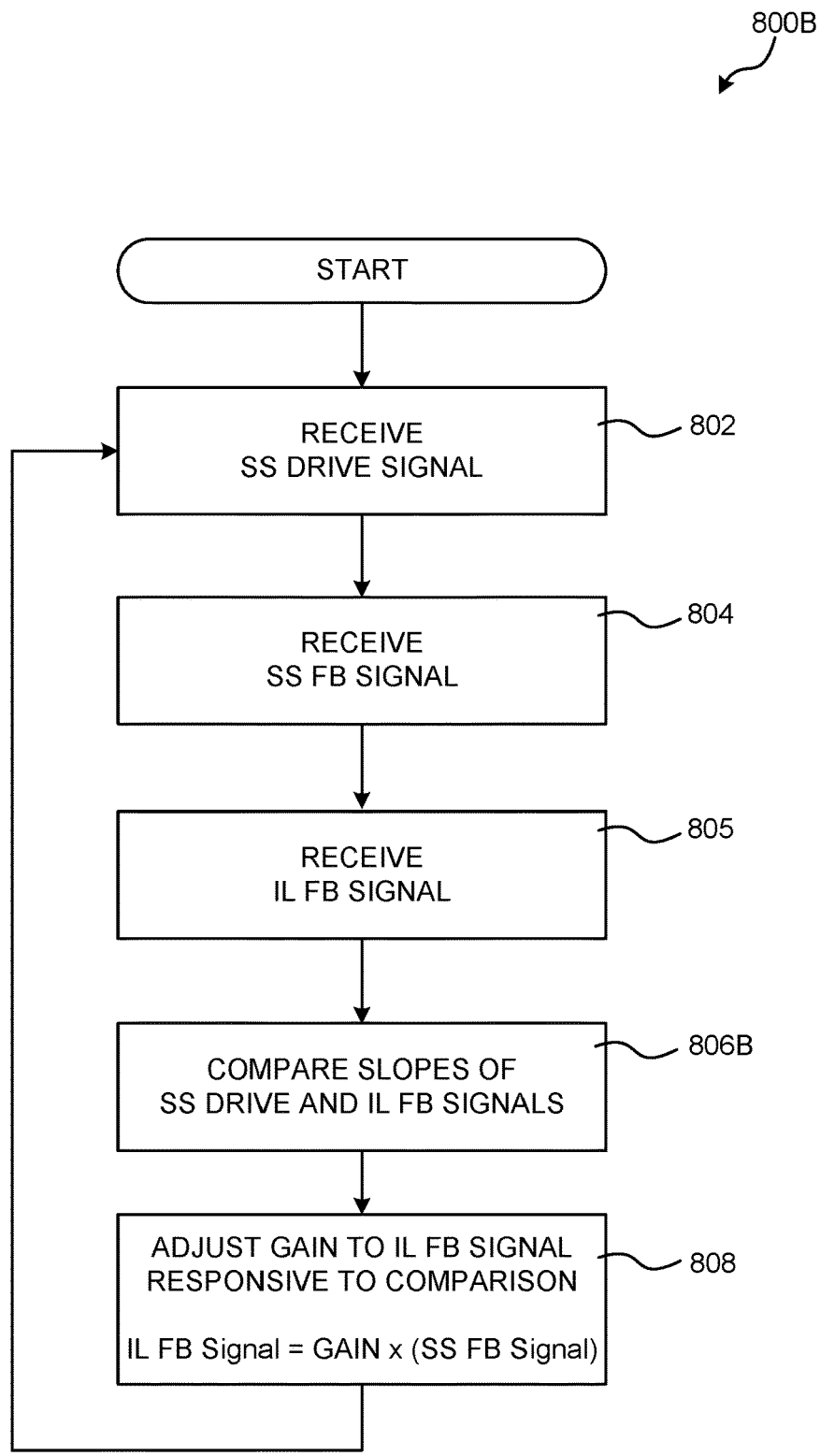
FIG. 8B shows a flowchart of yet another example method to adjust a feedback signal of the inner control loop to compensate the gain for the slow-scan mirror of a laser beam scanning display device.

FIG. 8B shows a flowchart of another example method 800B to adjust a feedback signal of the inner control loop to compensate the gain for the slow-scan mirror of a laser beam scanning display device. Aspects of method 800B may refer to the example dynamic gain adjustments described above with reference to FIGS. 1, 2, 3B, 4B, 5B, and 6B. Method 800B begins at operation 802, where the dynamic gain control block 235 receives the SS drive signal 232. Method 800B proceeds from operation 802 to operation 804, where the dynamic control block 235 receives the SS FB signal 233 from the SS mirror 220. Method 800B proceeds from operation 804 to operation 805, where the dynamic control block 235 receives the IL FB signal 236. Method 800B proceeds from operation 805 to operation 806B, where the dynamic control block 235 compares the slope of the SS drive signal 232 and the IL FB signal 236. Method 800B proceeds from operation 806B to operation 808, where the dynamic control block 235 adjusts the IL FB signal 236 responsive to at least the comparison from operation 806B. Since the IL FB signal 236 is part of the inner control loop of controller 210, the gain of the inner-control loop is effectively adjusted to achieve a target gain for the laser beam scanning display device.

Additional steps may be applied at block 808 in methods 800A and 800B to limit the gain adjustment and/or to limit the signal levels as previously discussed. Moreover, the measured slopes from blocks 806A and 806B may be evaluated to determine a measured gain (e.g., gain may be related to slope difference, slope ratio, etc.), which can then be compared to the target gain to determine the amount of gain adjustment required. In one example, the gain applied to the SS FB signal 233 at block 808 may be given as: IL FB=(GAIN)×(SS FB).

The received signals and slope comparison operations for methods 800A and 800B may be accomplished by any appropriate method, including both analog or digital solutions. Various operations of methods 800A and 800B may be done in parallel. For example, operations 802 and 804 and/or 805 may be performed substantially in parallel. Additionally, as previously described above, the feedback signal adjustment operation may be done continually, periodically, or using averaged values over a given period. Moreover, the slope comparison operations of methods 800A and 800B may be done by any appropriate method responsive to characteristics of the received signals.

Figure 9A:
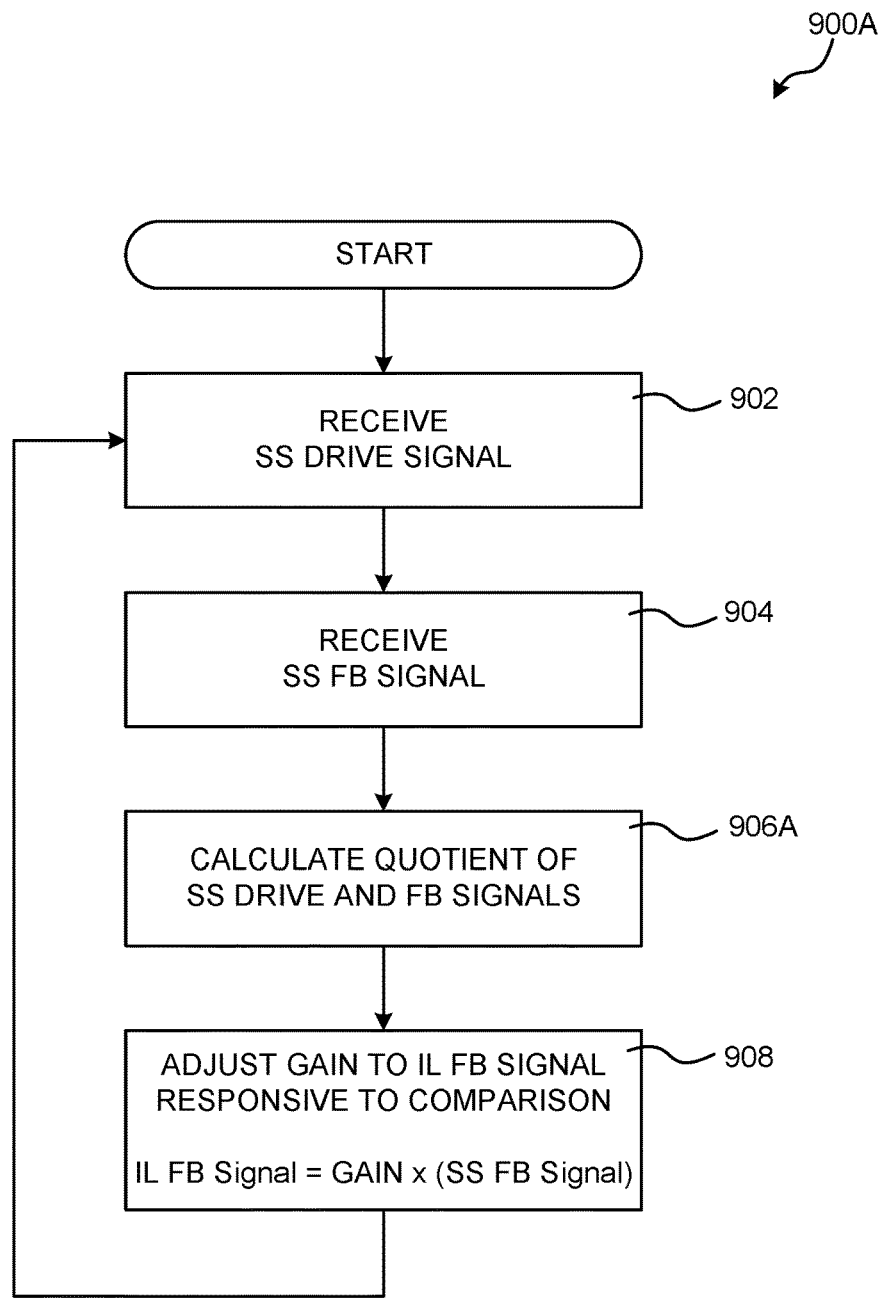
FIG. 9A shows a flowchart of still yet another example method to adjust a feedback signal of the inner control loop to compensate the gain for the slow-scan mirror of a laser beam scanning display device.

FIG. 9A shows a flowchart of an example method 900A to adjust a feedback signal of the inner control loop to compensate the gain for the slow-scan mirror of a laser beam scanning display device. Aspects of method 900A may refer to the example dynamic gain adjustments described above with reference to FIGS. 1, 2, 3A, 4A, 5A, and 6A. Method 900A begins at operation 902, where the dynamic gain control block 235 receives the SS drive signal 232. Method 900A proceeds from operation 902 to operation 904, where the dynamic control block 235 receives the SS FB signal 233 from the SS mirror 220. Method 900A proceeds from operation 904 to operation 906A, where the dynamic control block 235 determines a quotient of the SS drive signal 232 and the SS FB signal 233 from the SS mirror 220. Method 900A proceeds from operation 906A to operation 908, where the dynamic control block 235 adjusts the IL FB signal 236 responsive to at least the comparison from operation 906. Since the IL FB signal 236 is part of the inner control loop of controller 210, the gain of the inner-control loop is effectively adjusted to achieve a target gain for the laser beam scanning display device.

Figure 9B:
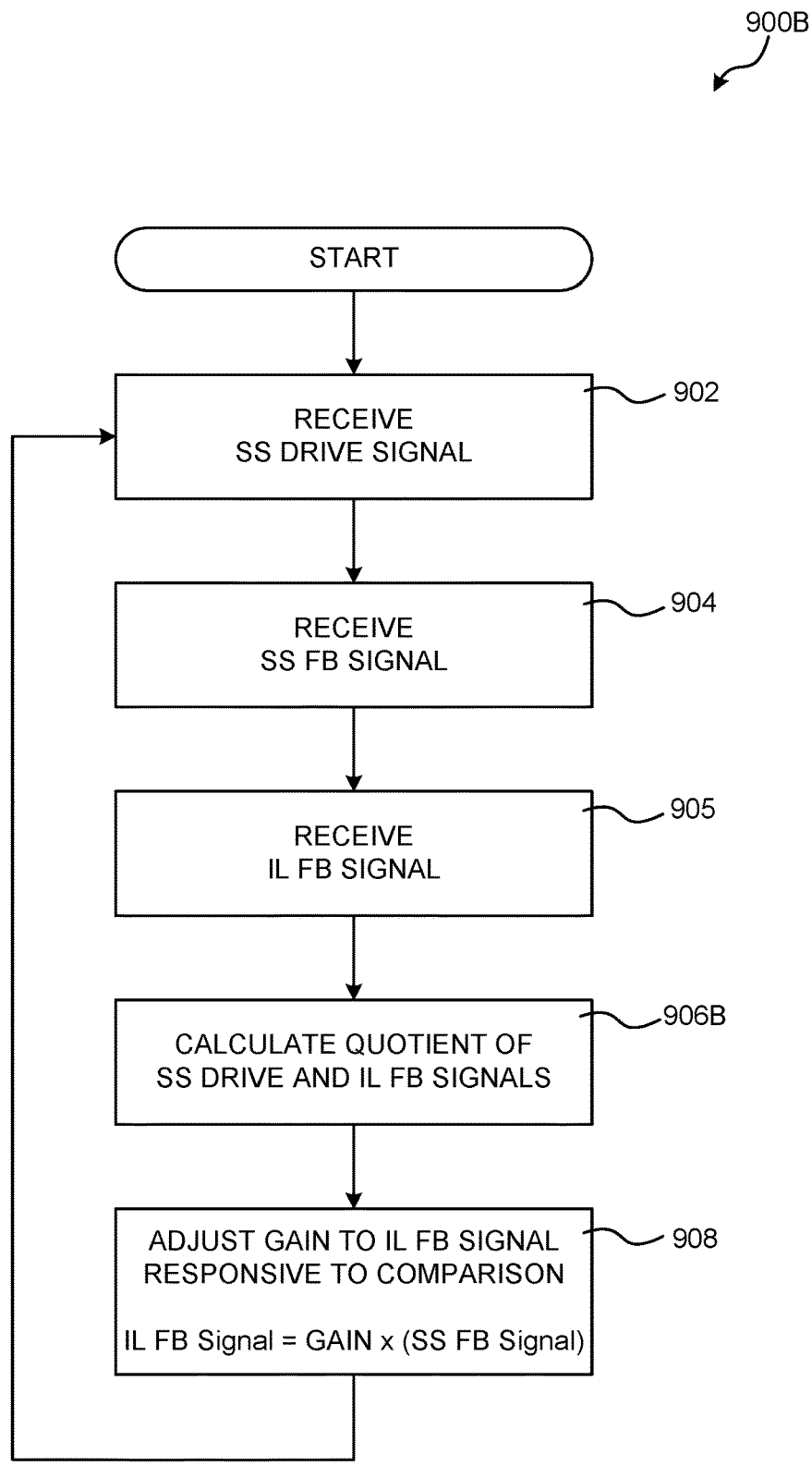
FIG. 9B shows a flowchart of yet still another example method to adjust a feedback signal of the inner control loop to compensate the gain for the slow-scan mirror of a laser beam scanning display device.

FIG. 9B shows a flowchart of an example method 900B to adjust a feedback signal of the inner control loop to compensate the gain for the slow-scan mirror of a laser beam scanning display device. Aspects of method 900B may refer to the example dynamic gain adjustments described above with reference to FIGS. 1, 2, 3B, 4B, 5B, and 6B. Method 900B begins at operation 902, where the dynamic gain control block 235 receives the SS drive signal 232. Method 900A proceeds from operation 902 to operation 904, where the dynamic control block 235 receives the SS FB signal 233 from the SS mirror 220. Method 900B proceeds from operation 904 to operation 905, where the dynamic control block 235 receives the IL FB signal 236. Method 900B proceeds from operation 905 to operation 906A, where the dynamic control block 235 determines a quotient of the SS drive signal 232 and the IL FB signal 236. Method 900B proceeds from operation 906B to operation 908, where the dynamic control block 235 adjusts the IL FB signal 236 responsive to at least the comparison from operation 906. Since the IL FB signal 236 is part of the inner control loop of controller 210, the gain of the inner-control loop is effectively adjusted to achieve a target gain for the laser beam scanning display device.

Additional steps may be applied at block 908 in methods 900A and 900B to limit the gain adjustment and/or to limit the signal levels as previously discussed. Moreover, the quotient from blocks 906A and 906B may be evaluated to determine a measured gain, which can then be compared to the target gain to determine the amount of gain adjustment required. In one example, the gain applied to the SS FB signal 233 at block 908 may be given as: IL FB=(GAIN)×(SS FB).

The received signals and quotient calculation operations for methods 900A and 900B may be achieved by any appropriate method, including both analog or digital solutions. Various operations of methods 900A and 900B may be done in parallel. For example, operations 902 and 904 and/or 905 may be performed substantially in parallel. Additionally, as previously described above, the feedback signal adjustment operation may be done continually, periodically, or using averaged values over a given period. Moreover, the quotient calculation operation of methods 900A and 900B may be done by any appropriate method responsive to characteristics of the received signals.

Figure 10A:
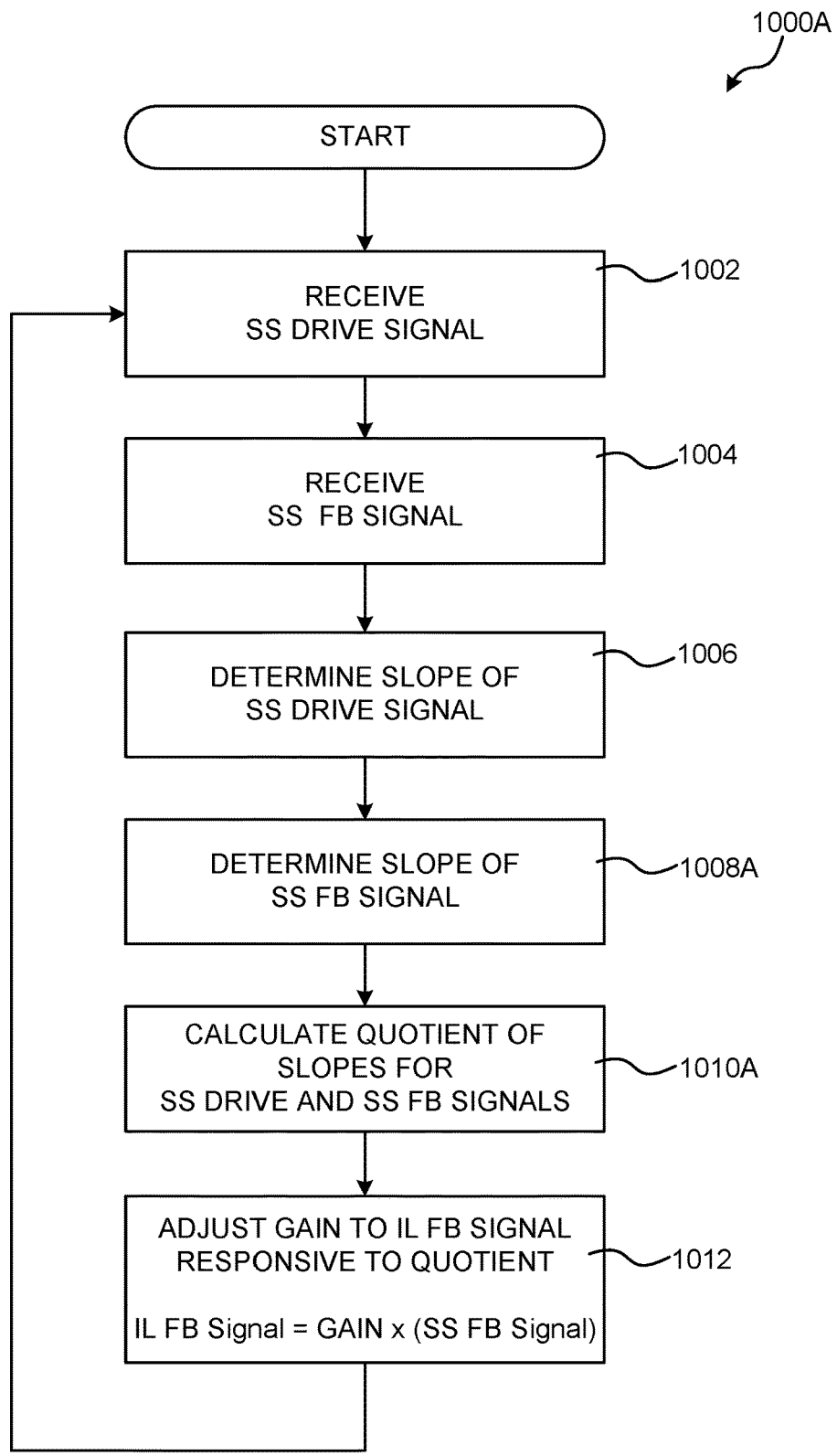
FIG. 10A shows a flowchart of an additional example method to adjust a feedback signal of the inner control loop to compensate the gain for the slow-scan mirror of a laser beam scanning display device.

FIG. 10A shows a flowchart of an example method 1000A to adjust a feedback signal of the inner control loop to compensate the gain for the slow-scan mirror of a laser beam scanning display device. Aspects of method 1000A may refer to the example dynamic gain adjustments described above with reference to FIGS. 1, 2, 3A, 4A, 5A, and 6A.

Method 1000A begins at operation 1002, where the dynamic gain control block 235 receives the SS drive signal 232. Method 1000A proceeds from operation 1002 to operation 1004, where the dynamic control block 235 receives the SS FB signal 233 from the SS mirror 220. Method 1000A proceeds from operation 1004 to operation 1006, where the dynamic control block 235 determines the slope of the SS drive signal 232. Method 1000A proceeds from operation 1006 to operation 1008A, where the dynamic control block 235 determines the slope of the SS FB signal 233. Method 1000A proceeds from operation 1008A to operation 1010A, where the dynamic control block 235 determines a quotient of the slopes for the SS drive signal 232 and the SS FB signal 233 from operations 1006 and 1008A. Method 1000 proceeds from operation 1008A to operation 1010A, where the dynamic control block 235 adjusts the IL FB signal 236 responsive to at least the calculated quotient of the slopes from operation 1010A. Since the IL FB signal 236 is part of the inner control loop of controller 210, the gain of the inner-control loop is effectively adjusted to achieve a target gain for the laser beam scanning display device.

Figure 10B:
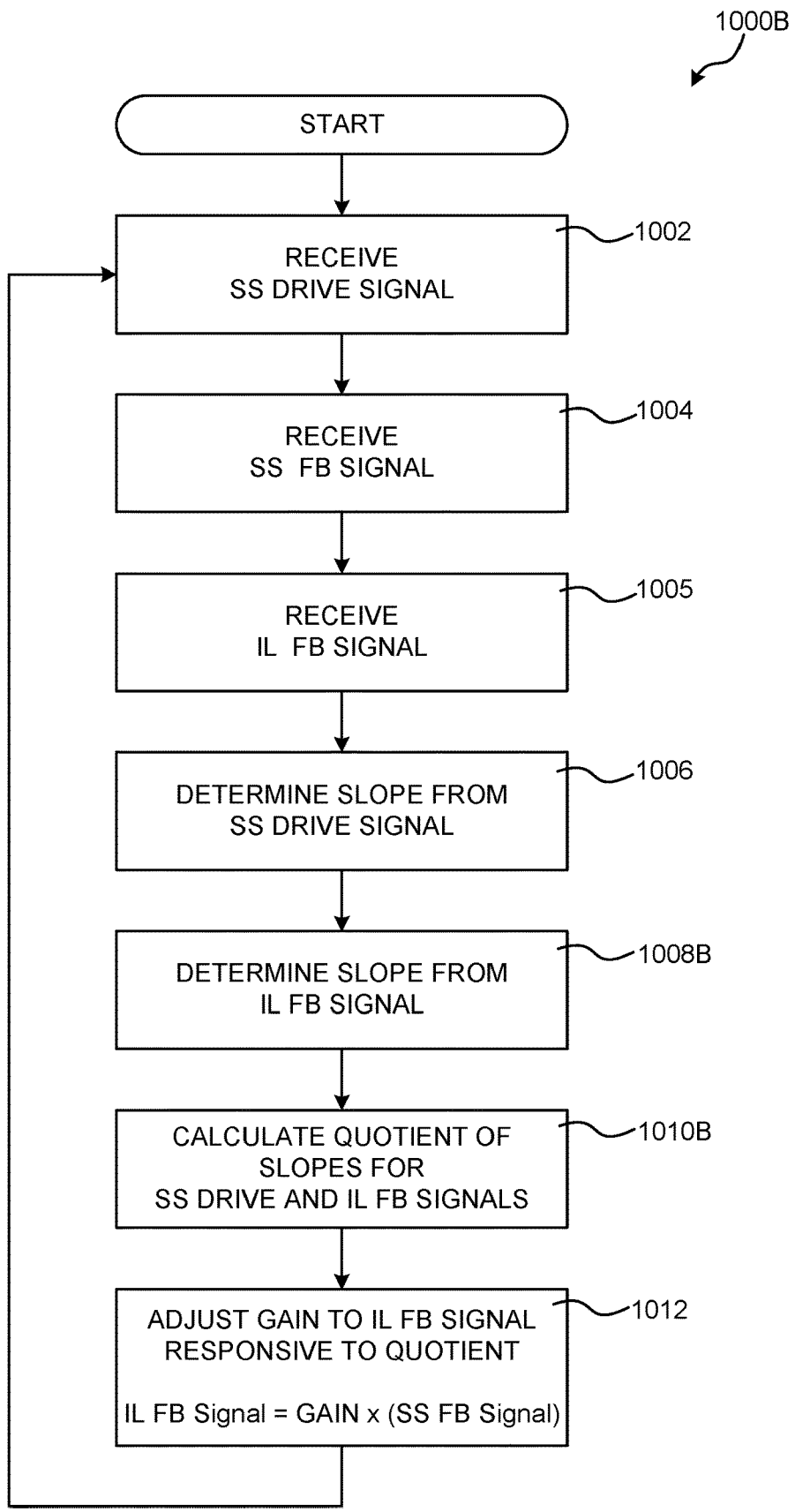
FIG. 10B shows a flowchart of another additional example method to adjust a feedback signal of the inner control loop to compensate the gain for the slow-scan mirror of a laser beam scanning display device.

FIG. 10B shows a flowchart of an example method 1000B to adjust a feedback signal of the inner control loop to compensate the gain for the slow-scan mirror of a laser beam scanning display device. Aspects of method 1000B may refer to the example dynamic gain adjustments described above with reference to FIGS. 1, 2, 3B, 4B, 5B, and 6B. Method 1000B begins at operation 1002, where the dynamic gain control block 235 receives the SS drive signal 232. Method 1000B proceeds from operation 1002 to operation 1004, where the dynamic control block 235 receives the SS FB signal 233 from the SS mirror 220. Method 1000B proceeds from operation 1004 to operation 1005, where the dynamic control block 235 receives the IL FB signal 236. Method 1000B proceeds from operation 1005 to operation 1006, where the dynamic control block 235 determines the slope of the SS drive signal 232. Method 1000B proceeds from operation 1006 to operation 1008B, where the dynamic control block 235 determines the slope of the IL FB signal 236. Method 1000B proceeds from operation 1008B to operation 1010B, where the dynamic control block 235 determines a quotient of the slopes for the SS drive signal 232 and the IL FB signal 236 from operations 1006 and 1008B. Method 1000B proceeds from operation 1008B to operation 1010B, where the dynamic control block 235 adjusts the IL FB signal 236 responsive to at least the calculated quotient of the slopes from operation 1010B. Since the IL FB signal 236 is part of the inner control loop of controller 210, the gain of the inner-control loop is effectively adjusted to achieve a target gain for the laser beam scanning display device.

Additional steps may be applied at block 1012 in methods 1000A and 1000B to limit the gain adjustment and/or to limit the signal levels as previously discussed. Moreover, the quotient from blocks 1010A and 1010B may be evaluated to determine a measured gain, which can then be compared to the target gain to determine the amount of gain adjustment required. In one example, the gain applied to the SS FB signal 233 at block 908 may be given as: IL FB=(GAIN)×(SS FB).

The received signals, slope and quotient calculation operations for methods 1000A and 1000B may be achieved by any appropriate method, including both analog or digital solutions. Various operations of methods 1000A and 100B may be done in parallel. For example, operations 1002 and 1004 and/or 1005 may be performed substantially in parallel, as well as operations 1006 and 1008A or 1008B.

Additionally, as previously described above, the feedback signal adjustment operation may be done continually, periodically, or using averaged values over a given period.

The slope and quotient calculation operations of method 1000 may be done by any appropriate method responsive to characteristics of the received signals. In some examples, the slope of the signals (e.g., SS drive signal 232, the SS FB signal 233 or IL FB signal 236) may be determined from the maximum (MAX) and minimum (MIN) values detected for each of those signals over one frame of data. In other examples, a best fit calculation may be utilized, where the best linear fit may be determined over a portion (e.g., 90%, 80%, 70%, etc.) or range of the captured data associated with those signals.

Figure 11:
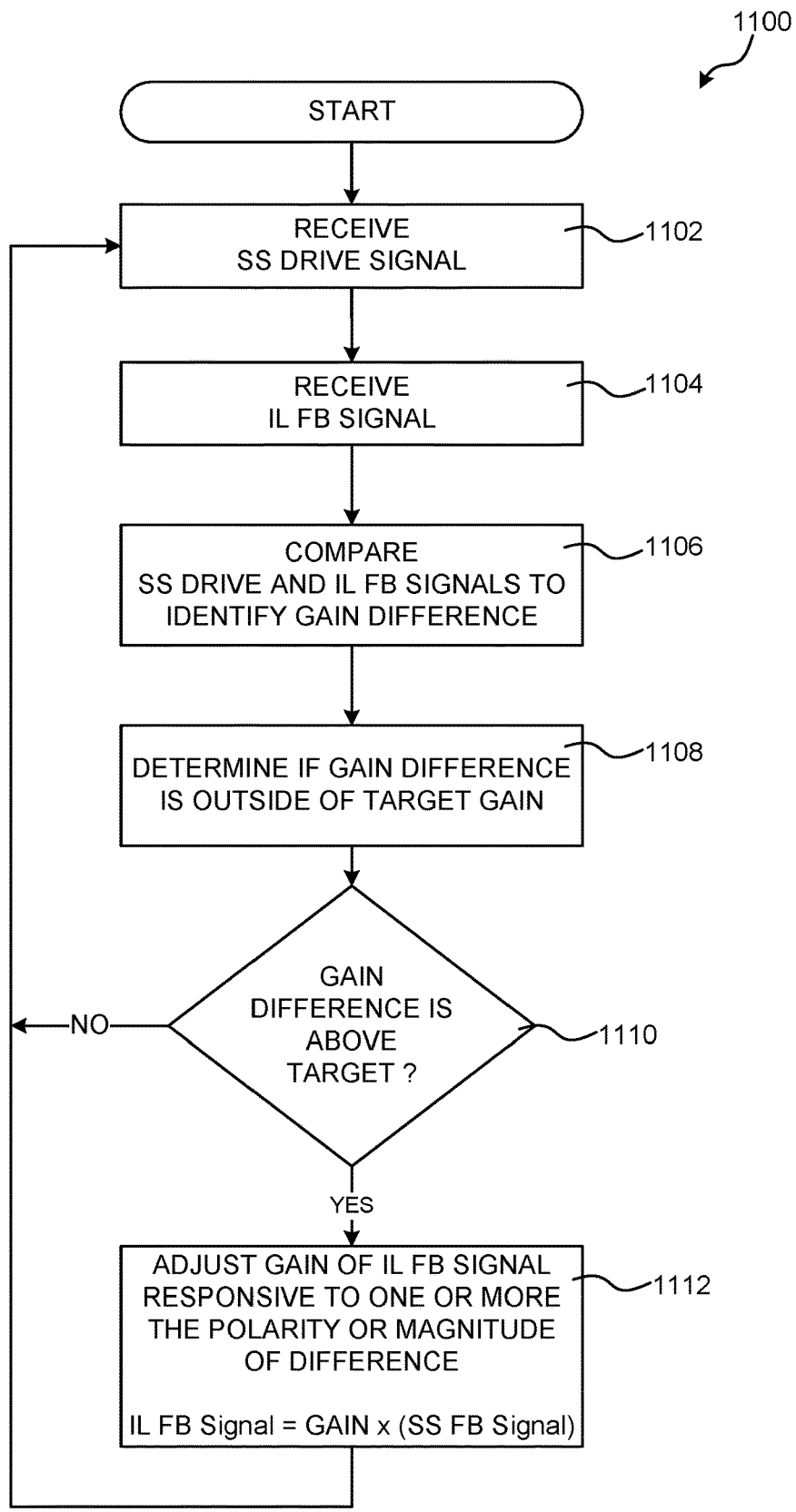
FIG. 11 shows a flowchart of still another example method to adjust a feedback signal of the inner control loop to compensate the gain for the slow-scan mirror of a laser beam scanning display device.

FIG. 11 shows a flowchart of an example method 1100 to adjust a feedback signal of the inner control loop to compensate the gain for the slow-scan mirror of a laser beam scanning display device. Aspects of method 1100 may refer to the example dynamic gain adjustments described above with reference to FIGS. 1-6A, B. Method 1100 begins at operation 1102, where the dynamic gain control block 235 receives the SS drive signal 232. Method 1100 proceeds from operation 1102 to operation 1104, where the dynamic control block 235 receives the SS FB signal 233 from the SS mirror 220. Method 1100 proceeds from operation 1104 to operation 1106, where the dynamic control block 235 determines a gain difference between the SS drive signal 232 and the SS FB signal 233. Method 1100 proceeds from operation 1106 to operation 1108, where the dynamic control block 235 compares the gain difference from operation 1106 with the target gain of the inner control loop. Method 1100 proceeds from operation 1108 to operation 1110, where the dynamic control block 235 determines if the gain difference is above the target gain. When the gain difference at operation 1110 is above the target gain, then processing continues from operation 1110 to operation 1120, where the dynamic control block 235 adjusts the IL FB signal 236 based on the polarity of the gain difference slopes from operation 1108. Since the IL FB signal is part of the inner control loop of controller 210, the gain of the inner-control loop is effectively adjusted to achieve a target gain for the laser beam scanning display device. The magnitude of the gain difference may also be employed to determine an amount of gain increase or decrease.

The received signals and comparison operations for method 1100 may be achieved by any appropriate method, including both analog or digital solutions. Various operations of method 1100 may be done in parallel. For example, operations 1102 and 1104 may be performed substantially in parallel. Additionally, as previously described above, the feedback signal adjustment operation may be done continually, periodically, or using averaged values over a given period. The comparison operations of method 1100 may be done by any appropriate method responsive to characteristics of the received signals.

In some examples of method 1100, the PID controller 630 of FIG. 6A or 6B may be configured (e.g., by setting the PID coefficients and selecting the inputs and outputs of the PID controller) to adjust the IL FB signal 236 by applying the gain difference at as an error signal, e(t) to the PID controller, adjusting the correction factor output, u(t), based on the target gain and the error signal. Thus, the PID controller 630 may effectively increase or decrease the IL FB signal 236 based on the correction factor, u(t).

FIGS. 12-15 show various graphs illustrating gain differences, and dynamic gain adjustments applied to an example slow-scan mirror assembly.

Figure 12:
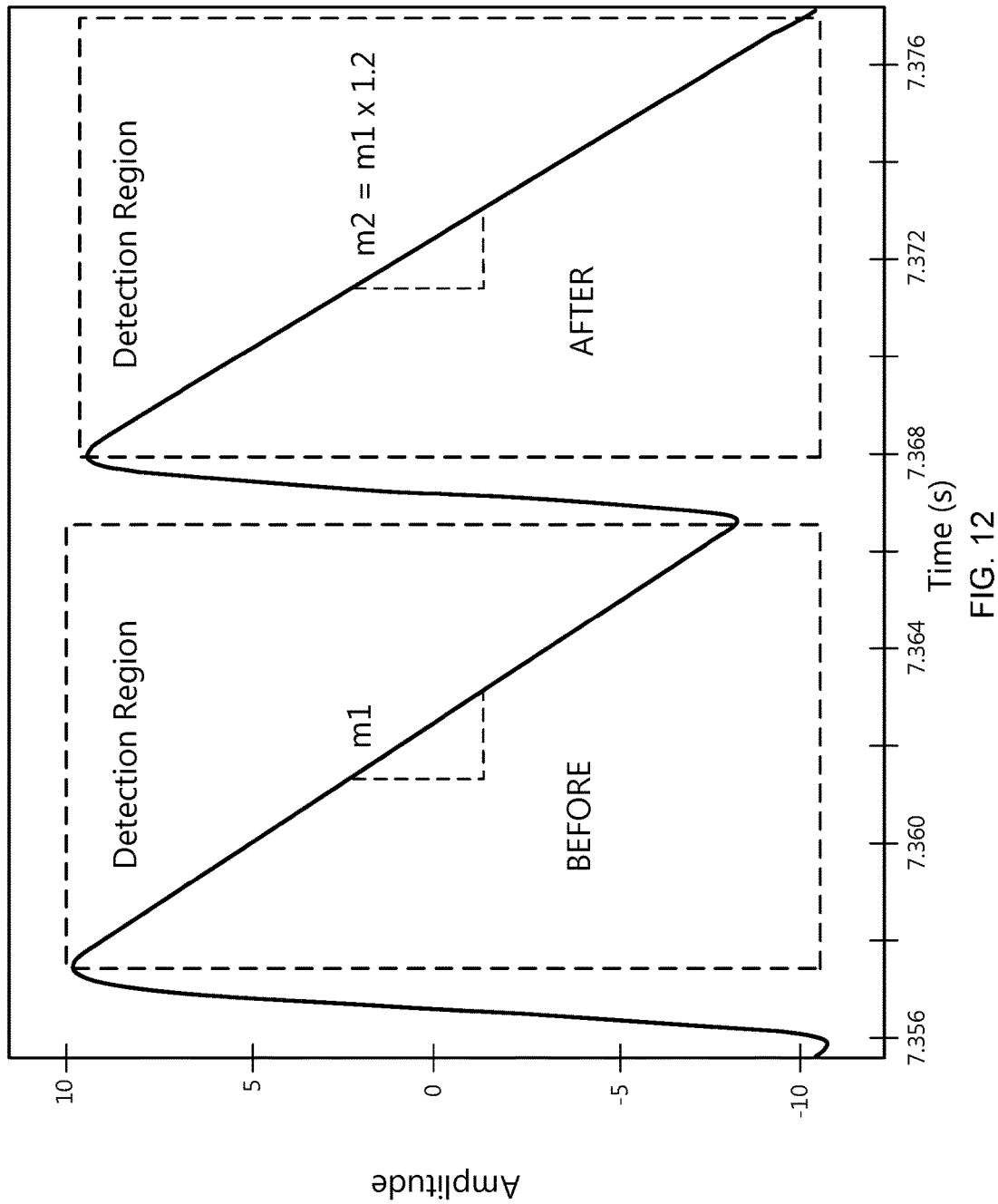
FIG. 12 shows a graph illustrating an example of a dynamic gain adjustment applied to an example slow-scan mirror assembly.

FIG. 12 shows a graph of the SS FB signal 233, to demonstrate a changes in the signal before and after adjustments are applied. As shown, the "BEFORE" graph illustrates a waveform for the SS FB signal before a gain adjustment is made, which has a first slope ("m1"). The "AFTER" graph illustrates a waveform for the SS FB signal after a gain adjustment is made, which has a second slope ("m2"). The slope are determined about the linear portions of the waveforms, which is typically around the central portion that is roughly the midpoint of the amplitude. Slope m2 may be related to the slope m1, in this example m2=120% of m1 or m2=m1×1.20. In other words, the change in the slope is a multiplication or gain factor of 1.20, which indicates change in gain of the system.

Figure 13:
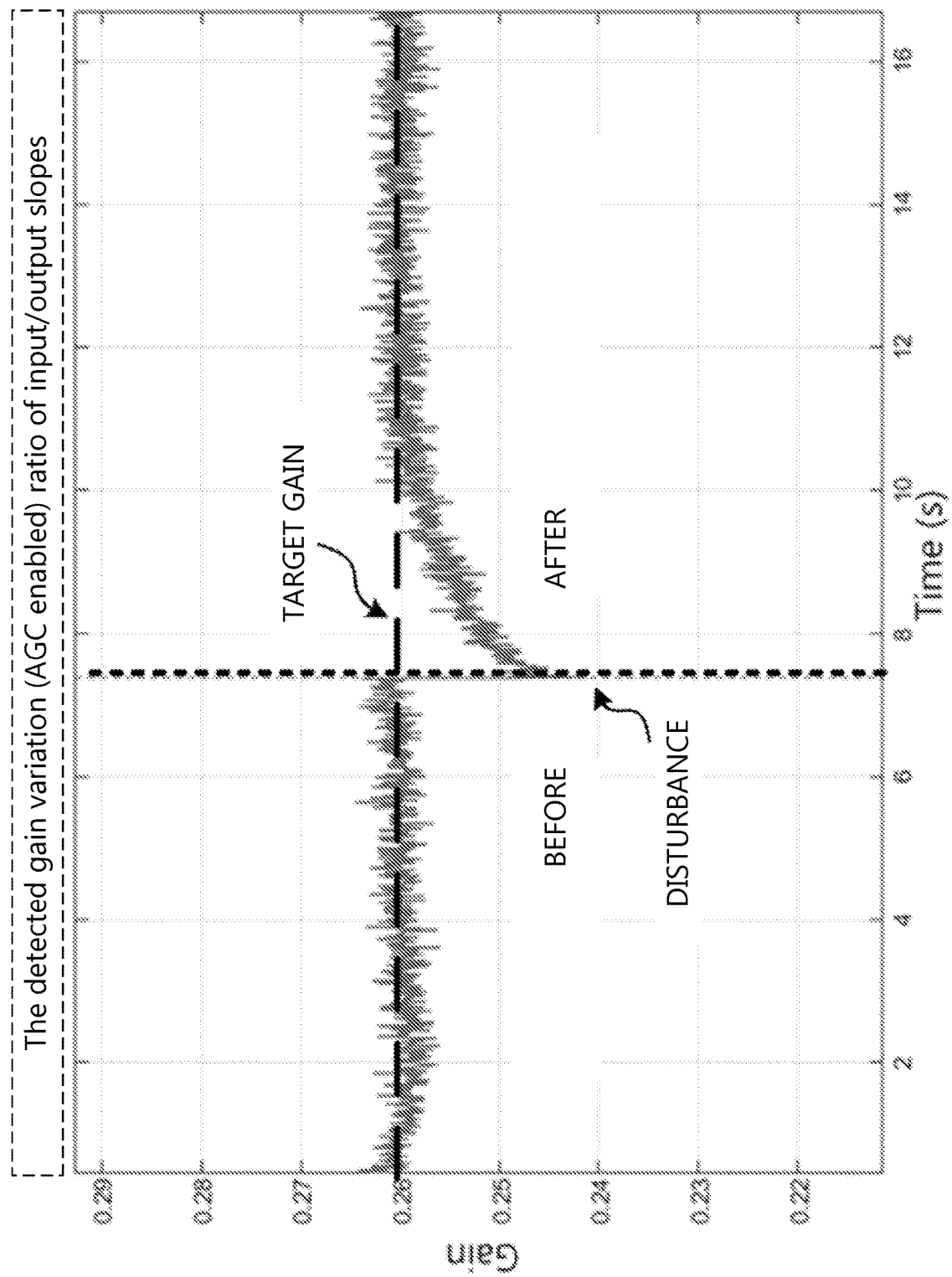
FIG. 13 shows a graph illustrating another example of a dynamic gain adjustment applied to an example slow-scan mirror assembly.

FIG. 13 shows a graph of the gain over time for an example LBS system that includes dynamic gain control in accordance with aspects of the present disclosure. As shown the gain is held fairly constant to a target gain value of about 0.26 by operation of the automatic gain control (AGC) of the inner loop from time 0 s to about 7.5 s (e.g., "BEFORE"). At time 7.5 s, a disturbance occurs that causes a change in the gain to occurs (e.g., dropping to about 0.24). From time 7.5 s to about 11 s (e.g., "AFTER"), the inner control loop applies dynamic gain control to adjust the inner loop feedback signal, and the gain is again brought back to the target gain of about 0.26, and then remains substantially constant from time 11 s to about time 16 s and onwards.

Figure 14:
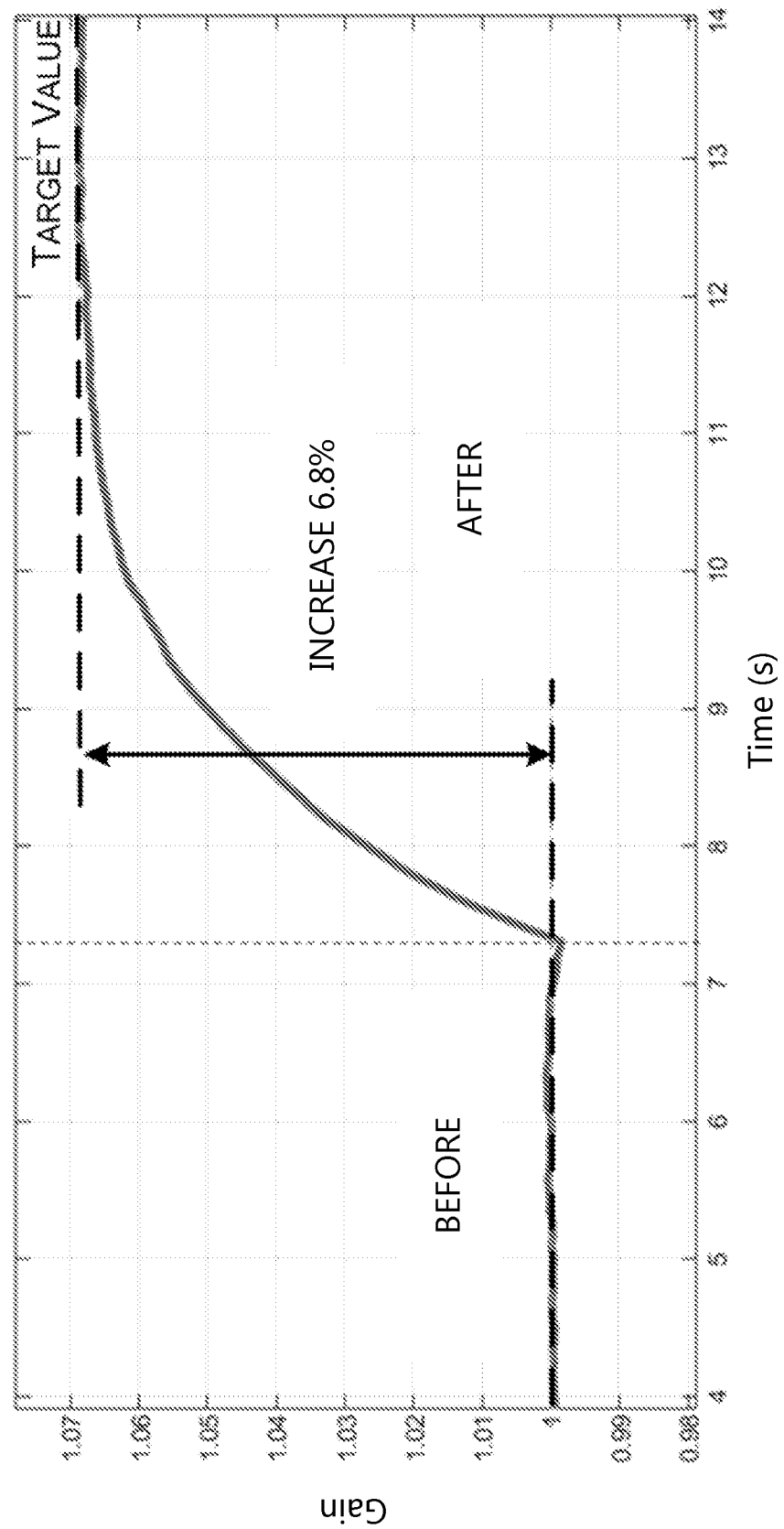
FIG. 14 shows a graph illustrating another example of a dynamic gain adjustment applied to an example slow-scan mirror assembly.

FIG. 14 shows a graph of the gain of the dynamic gain adjustment block 235, to demonstrate a difference in the gain before and after the automatic inner loop gain control adjusts and compensates for a detected gain difference. As shown on the left side of the graph (e.g., "BEFORE"), for the time between about 4 s and 7.3 s the gain is stable with a value of about 1.0. Around time 7.3 s, the control loop detects that a gain change is required, and the gain is increased by about 6.8% to achieve an overall target gain of about 1.068. As shown on the right side of the graph (e.g., "AFTER"), for the time between about 7.3 s to about 12 s, the gain changes by operation of the automatic inner loop gain control (AIGC) as previously described. Starting around time of about 12 s. the gain is again stable at the target value.

The disclosed embodiments can be implemented using a number of technologies. For example, embodiments can be implemented using software/firmware (e.g., DSP, digital Si logic, FPGA, firmware, etc.), or hardware (PCB board with discrete components), or a combination of hardware and software. For example, the filters in FIG. 2 may be implemented using analog filters, wherein the poles and zeros may be adjusted by using appropriate resistors, capacitors, and other components. In another example the filters in FIG. 2 may be implemented using one or more DSP chips or embedded CPUs. The various components may be soldered on a single PCB, or a set of boards.

Figure 15:
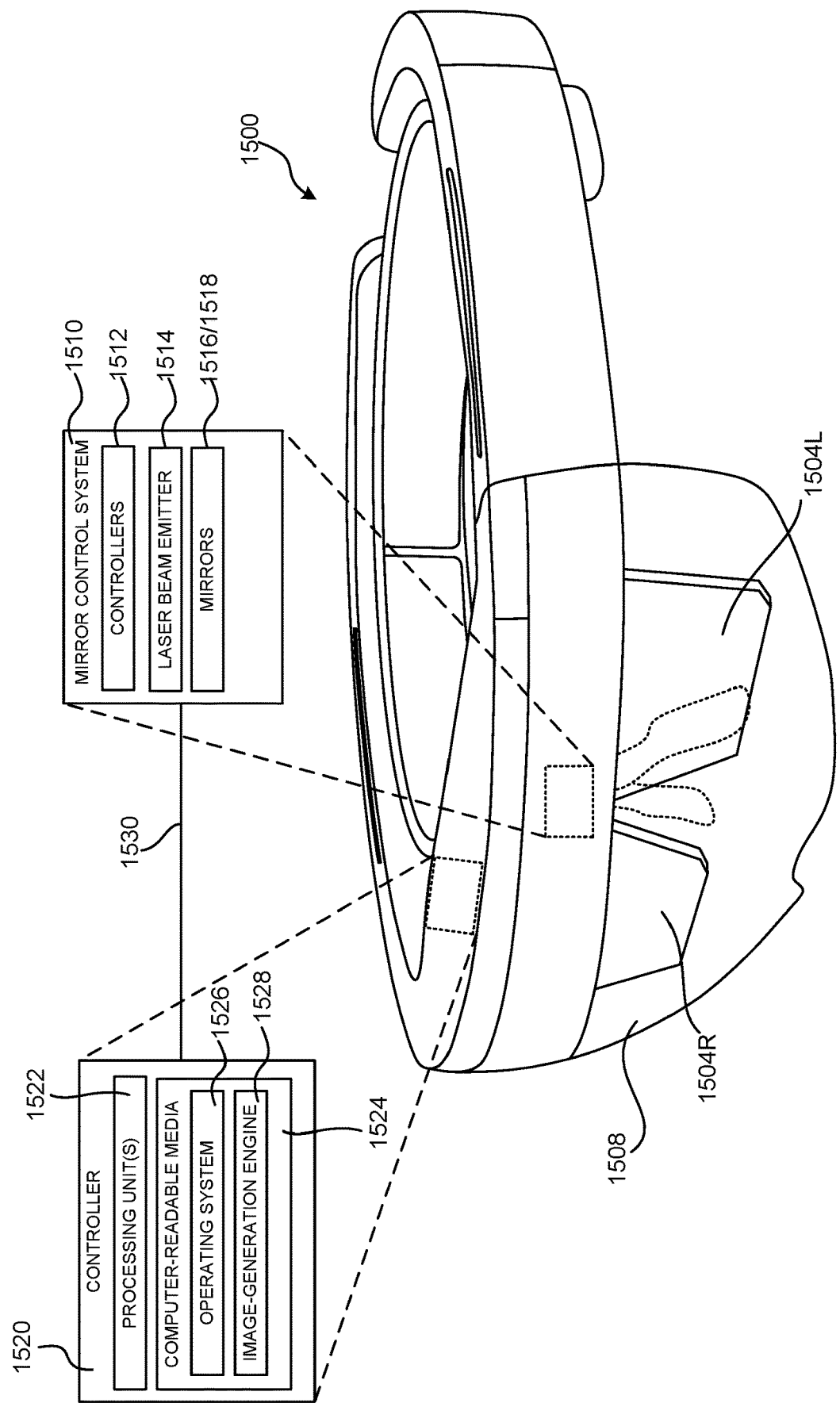
FIG. 15 shows the display device in the form of a head-mounted display device.

FIG. 15 shows the display device in the form of a head-mounted display device. The head-mounted display may be a near-eye display ("NED") device 1500 that includes a mirror control system 1510 implementing aspects of the technologies disclosed herein. The mirror control system 1510 includes the laser beam emitter 1514, mirrors 1516 and 1518, and controllers 1512. Similar components were described in detail above with regard to FIGS. 1-14.

In some examples, the NED device 1500 may utilize the mirror control system 1510 to generate a composite view (e.g., from a perspective of a user that is wearing the NED device 1500) that includes both one or more computer-generated ("CG") images and a view of at least a portion of a real-world environment surrounding the NED device

1500. For example, the mirror control system 1510 may utilize various technologies such as, for example, augmented reality ("AR") technologies to generate composite views that include CG images superimposed over a real-world view. As such, the mirror control system 1510 may be configured to generate CG images via a display panel 1504.

In the illustrated example, the display panel 1504 includes separate right eye and left eye transparent display panels, labeled 1504R and 1504L, respectively. In some examples, the display panel 1504 may include a single transparent display panel that is viewable with both eyes and/or a single transparent display panel that is viewable by a single eye only.

It can be appreciated that the techniques described herein may be deployed within a single-eye NED device 1500 (e.g. GOOGLE GLASS) and/or a dual-eye NED device 1500 (e.g. MICROSOFT HOLOLENS). The NED device 1500 shown in FIG. 15 is an example device that is used to provide context and illustrate various features and aspects of the mirror control system 1510 disclosed herein. Other devices and systems may also use the mirror control system 1510 disclosed herein.

In some examples, the display panel 1504 may be a waveguide display that includes one or more diffractive optical elements ("DOEs") for in-coupling incident light into a waveguide, expanding the incident light in one or more directions for exit pupil expansion, and/or out-coupling the incident light out of the waveguide (e.g., toward a user's eye). In some examples, the NED device 1500 may further include an additional see-through optical component in the form of a transparent veil 1508 positioned between the real-world environment (which real-world environment makes up no part of the claimed invention) and the display panel 1504.

It can be appreciated that the transparent veil 1508 may be included in the NED device 1500 for purely aesthetic and/or protective purposes. The NED device 1500 may further include various other components, for example speakers, microphones, accelerometers, gyroscopes, magnetometers, temperature sensors, touch sensors, inertial measurement sensors, biometric sensors, other image sensors, energy-storage components (e.g. battery), a communication facility, a global positioning system ("GPS") receiver, etc.

In the illustrated example, a controller 1520 is operatively coupled to the mirror control system 1510. The controller 1520 includes one or more logic devices and one or more computer memory devices storing instructions executable by the logic device(s) to deploy aspects of the functionality described herein with relation to the mirror control system 1510. The controller 1520 and the mirror control system 1510 of the NED device 1500 are operatively connected, for example, via a bus 1530, which can include one or more of a system bus, a data bus, an address bus, a PCI bus, a Mini-PCI bus, and any variety of local, peripheral, and/or independent buses.

The controller 1520 can also include one or more processing units 1522. The processing unit(s) 1522, can represent, for example, a CPU-type processing unit, a GPU-type processing unit, a field-programmable gate array ("FPGA"), a digital signal processor ("DSP"), or other hardware logic components that may, in some instances, be driven by a CPU. For example, and without limitation, illustrative types of hardware logic components that can be used include Application-Specific Integrated Circuits ("ASICs"), Application-Specific Standard Products ("ASSPs"), System-on-a-Chip Systems ("SOCs"), Complex Programmable Logic Devices ("CPLDs"), etc.

The controller 1520 can also include one or more computer-readable media 1524 storing an operating system 1526 and data such as, for example, image data that defines one or more CG images for presentation by the NED device 1500. The computer-readable media 1524 may further include an image-generation engine 1528 that generates output signals to control aspects of the operation of the mirror control system 1510 to present the CG images.

As used herein, computer-readable media, such as computer-readable media 1524, can store instructions executable by the processing units 1522. The computer-readable media 1524 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in the NED device 1500, while in some examples one or more of a CPU, GPU, and/or accelerator are external to the NED device 1500.

As used herein, the term computer-readable media can include computer storage media and/or communication media. Computer storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data.

Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, rotating media, optical cards or other optical storage media, magnetic storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device in a non-transitory fashion.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Figure 16:
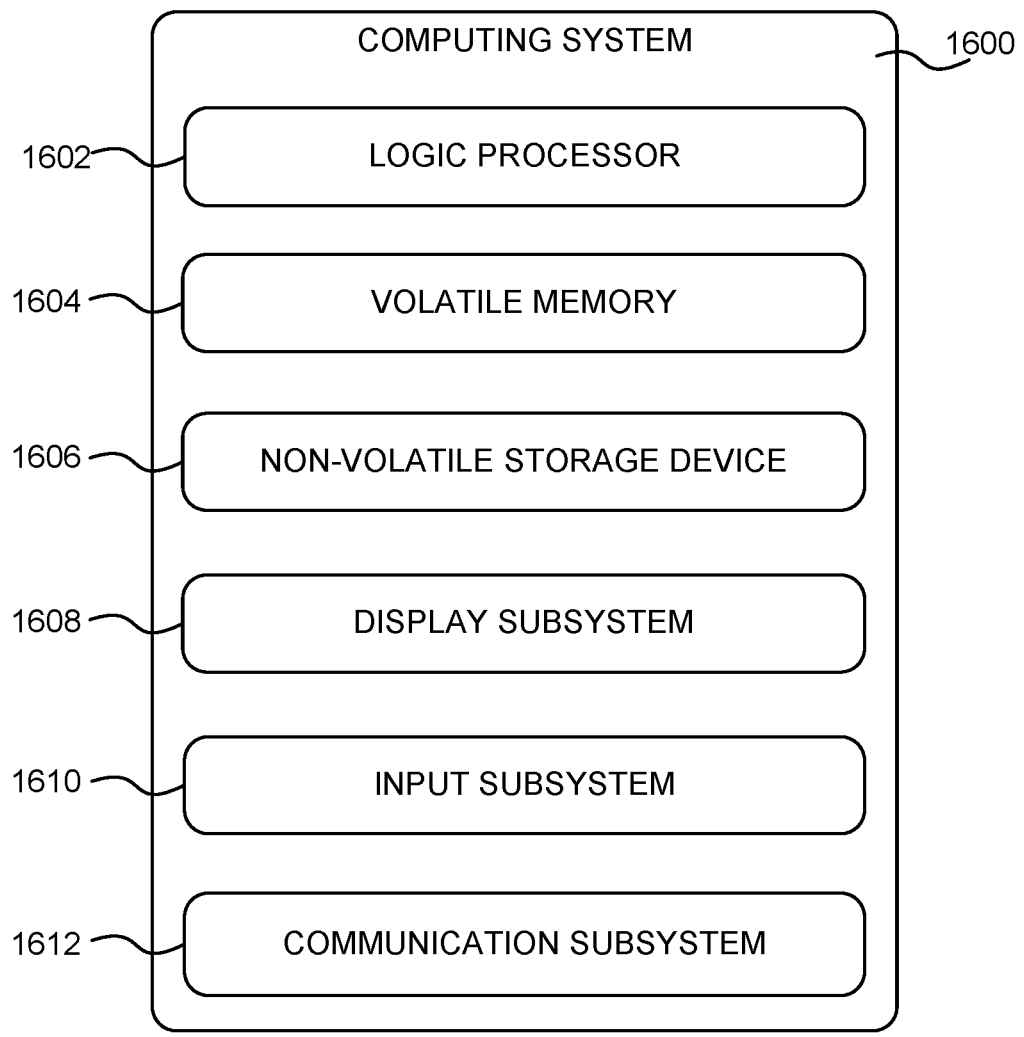
FIG. 16 shows an example computing environment in which the computer device may be enacted.

FIG. 16 shows an example computing environment in which aspects of the technologies disclosed herein can be implemented. In particular, FIG. 16 schematically shows a non-limiting embodiment of a computing system 1600 that can be used to implement the technologies disclosed herein. Computing system 1600 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1600 includes a logic processor 1602 volatile memory 1604, and a non-volatile storage device 1606. Computing system 1600 may optionally include a display subsystem 1608, input subsystem 1610, communication subsystem 1612, and/or other components not shown in FIG. 16.

Logic processor 1602 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1602 may include one or more physical processors (e.g., hardware) configured to execute software instructions. Additionally, or alternatively, the logic processor 1602 may include one or more hardware logic circuits or firmware devices configured to execute hardware-implemented logic or firmware instructions.

The logic processor 1602 may be single-core or multi-core, and the instructions executed thereon may be configured for sequential, parallel, and/or distributed processing. Individual components of the logic processor 1602 optionally may be distributed among two or more separate devices, which may be remotely located and/or configured for coordinated processing. Aspects of the operation of the logic processor 1602 may be virtualized and executed by remotely accessible, networked computing devices configured in a cloud-computing configuration. In such a case, these virtualized aspects are run on different physical logic processors of various different machines, it will be understood.

Non-volatile storage device 1606 includes one or more physical devices configured to hold instructions executable by the logic processors to implement aspects of the methods and processes described herein. When such methods and processes are implemented, the state of non-volatile storage device 1606 may be transformed—e.g., to hold different data.

Non-volatile storage device 1606 may include physical devices that are removable and/or built in. Non-volatile storage device 1606 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1606 may include nonvolatile, dynamic, static, read/write, read-only, sequential-access, location-addressable, file-addressable, and/or content-addressable devices. It will be appreciated that non-volatile storage device 1606 is configured to hold instructions even when power is cut to the non-volatile storage device 1606.

Volatile memory 1604 may include physical devices that include random access memory. Volatile memory 1604 is typically utilized by logic processor 1602 to temporarily store information during processing of software instructions. It will be appreciated that volatile memory 1604 typically does not continue to store instructions when power is removed from the volatile memory 1604. Aspects of logic processor 1602, volatile memory 1604, and non-volatile storage device 1606 may be integrated together into one or more hardware-logic components, such as within an ASIC, SOC, or FPGA.

The terms "module," "program," and "engine" may be used to describe an aspect of computing system 1600 typically implemented in software by a processor 1602 to perform a particular function using portions of volatile memory 1604, which function involves transformative processing that specially configures the processor 1602 to perform the function. Thus, a module, program, or engine may be instantiated via logic processor 1602 executing instructions held by non-volatile storage device 1606, using portions of volatile memory 1604.

It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1608 may be used to present a visual representation of data held by non-volatile storage device 1606. The visual representation may take the form of a graphical user interface ("GUI"). As the herein described methods and processes change the data held by the non-volatile storage device, and thus transform the state of the non-volatile storage device, the state of display subsystem 1608 may likewise be transformed to visually represent changes in the underlying data. Display subsystem 1608 may include one or more display devices utilizing virtually any type of technology, such as the LBS display devices disclosed herein. Such display devices may be combined with logic processor 1602, volatile memory 1604, and/or non-volatile storage device 1606 in a shared enclosure, or such display devices may be peripheral display devices.

When included, input subsystem 1610 may comprise or interface with one or more user-input devices such as a keyboard, mouse, touch screen, or game controller. In some embodiments, the input subsystem may comprise or interface with selected natural user input ("NUI") componentry. Such componentry may be integrated or peripheral, and the transduction and/or processing of input actions may be handled on- or off-board.

Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1612 may be configured to communicatively couple various computing devices described herein with each other, and with other devices. Communication subsystem 1612 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 1600 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The disclosure presented herein also encompasses the subject matter set forth in the following clauses:

Example Clause 1: A display device (100) to display an image in a display region, the display device comprising: a laser beam emitter configured to emit a laser beam; a slow-scan mirror (220) that is responsive to a slow-scan drive signal (232) to direct the laser beam onto the display region and generate the image, wherein the slow-scan mirror (220) generates a slow-scan feedback signal (233); a slow-scan driver (231) configured to generate the slow-scan drive signal (232); and a slow-scan controller (210) configured to adjust the slow-scan drive signal (232) for the slow-scan mirror (220) with the slow-scan driver (232), wherein the slow-scan controller (210) comprises: an outer control loop with an open angle control (215) for the slow-scan mirror (220); and an inner control loop (230) with a dynamic gain control (235) for the slow-scan mirror (220), wherein the outer control loop and the inner control loop are responsive to the slow-scan feedback signal (233), and wherein the inner control loop (230) is also responsive to the slow-scan drive signal (232) and adapted to dynamically adjust the gain of the inner-control loop to achieve a target gain such that overall gain variations from at least the slow-scan mirror are compensated and stabilized.

Example Clause 2: The display device of clause 1, wherein the display device is configured to limit a loop gain of the inner control loop to a maximum value.

Example Clause 3: The display device of clause 1, wherein the display device is configured to continuously update a loop gain of the inner control loop.

Example Clause 4: The display device of clause 1, wherein the display device is configured to periodically update a loop gain of the inner control loop.

Example Clause 5: The display device of clause 4, wherein the display device is further configured to periodically update the loop gain according to a period in a range from a lower value to a higher value, wherein the lower value corresponding to one of: about 5 Hz, 10 Hz, 15 Hz, 20 Hz, 30 Hz, 60 Hz, or 90 Hz, and wherein the upper value corresponds to one of and about 10 Hz, 15 Hz, 20 Hz, 30 Hz, 60 Hz, 90 Hz, or 120 Hz; and wherein the upper value is greater than the lower value.

Example Clause 6: The display device of clause 1, wherein the dynamic gain control is configured to receive the slow-scan drive signal, receive the slow-scan feedback signal, compare the amplitudes of the slow-scan drive signal and the slow-scan feedback signal, and adjust the gain of the inner control loop responsive to the comparison and the target gain such that the slow-scan feedback signal is gain scaled by the adjusted gain to provide an inner-loop feedback signal.

Example Clause 7: The display device of clause 1, wherein the dynamic gain control is configured to receive the slow-scan drive signal, receive the slow-scan feedback signal, receive an inner-loop feedback signal, compare the amplitudes of the slow-scan drive signal and the inner-loop feedback signal, and adjust the gain of the inner control loop responsive to the comparison and the target gain such that the slow-scan feedback signal is gain scaled by the adjusted gain to provide the inner-loop feedback signal.

Example Clause 8: The display device of clause 1, wherein the dynamic gain control is configured to receive the slow-scan drive signal, receive the slow-scan feedback signal, compare the slopes of the slow-scan drive signal and the slow-scan feedback signal, and adjust the gain of the inner control loop responsive to the comparison and the target gain such that the slow-scan feedback signal is gain scaled by the adjusted gain to provide an inner-loop feedback signal.

Example Clause 9: The display device of clause 1, wherein the dynamic gain control is configured to receive the slow-scan drive signal, receive the slow-scan feedback signal, receive an inner-loop feedback signal, compare the slopes of the slow-scan drive signal and the inner-loop feedback signal, and adjust the gain of the inner control loop responsive to the comparison and the target gain such that the slow-scan feedback signal is gain scaled by the adjusted gain to provide the inner-loop feedback signal.

Example Clause 10: The display device of clause 1, wherein the dynamic gain control is configured to receive the slow-scan drive signal, receive the slow-scan feedback signal, calculate a quotient of the amplitudes of the slow-scan drive signal and the slow-scan feedback signal, and adjust the gain of the inner control loop responsive to the calculated quotient and the target gain such that the slow-scan feedback signal is gain scaled by the adjusted gain to the provide an inner-loop feedback signal.

Example Clause 11: The display device of clause 1, wherein the dynamic gain control is configured to receive the slow-scan drive signal, receive the slow-scan feedback signal, receive an inner-loop feedback signal, calculate a quotient of the amplitudes of the slow-scan drive signal and the inner-loop feedback signal, and adjust the gain of the inner control loop responsive to the calculated quotient and the target gain such that the slow-scan feedback signal is gain scaled by the adjusted gain to the provide the inner-loop feedback signal.

Example Clause 12: The display device of clause 1, wherein the dynamic gain control is configured to: receive the slow-scan drive signal, receive the slow-scan feedback signal, determine a slope of the slow-scan drive signal, determine a slope of the slow-scan feedback signal, calculate a quotient of the slopes of the slow-scan drive signal and the slow-scan feedback signal, and adjust the gain of the inner control loop responsive to the calculated quotient and the target gain such that the slow-scan feedback signal is gain scaled by the adjusted gain to provide an inner-loop feedback signal.

Example Clause 13: The display device of clause 1, wherein the dynamic gain control is configured to: receive the slow-scan drive signal, receive the slow-scan feedback signal, receive an inner-loop control signal, determine a slope of the slow-scan drive signal, determine a slope of the inner-loop feedback signal, calculate a quotient of the slopes of the slow-scan drive signal and the inner-loop feedback signal, and adjust the gain of the inner control loop responsive to the calculated quotient and the target gain such that the slow-scan feedback signal is gain scaled by the adjusted gain to provide the inner-loop feedback signal.

Example Clause 14: The display device of clause 1, wherein the dynamic gain control (235) is configured to: receive the slow-scan drive signal, receive the slow-scan feedback signal, receive an inner-loop control signal, compare the slow-scan drive signal and the inner-loop feedback signal to identify a gain difference, determine if the gain difference is above the target gain, and adjust the gain of the inner control loop when the gain difference is above the target gain, responsive to one or more of the polarity or magnitude of the gain difference such that the slow-scan feedback signal is gain scaled by the adjusted gain to provide the inner-loop feedback signal.

Example Clause 15: The display device of clause 14, wherein the dynamic gain control is configured to either increase or decrease the gain by an amount proportional to the magnitude of the gain difference.

Example Clause 16: The display device of any of clauses herein, wherein the dynamic gain control is configured to limit the loop gain of the inner control loop to a maximum value.

Example Clause 17: The display device of clause 16, wherein the dynamic gain control is further configured such that the maximum value corresponds to one of: 150% of the target gain, 140% of the target gain, 135% of the target gain, 130% of the target gain, 125% of the target gain 120% of the target gain, and 115% of the target gain.

Example Clause 18: The display device of any of the clauses herein, wherein the dynamic gain control is configured to maintain the loop gain of the inner control loop above a minimum value.

Example Clause 19: The display device of clause 18, wherein the dynamic gain control is further configured such that the minimum value corresponds to one of: 50% of the target gain, 55% of the target gain, 60% of the target gain, 65% of the target gain, 70% of the target gain 75% of the target gain, and 80% of the target gain.

Example Clause 20: The display device of any of the clauses herein, wherein the dynamic gain control is configured to continuously update a loop gain of the inner control loop.

Example Clause 21: The display device of clause any of the clauses herein, wherein the dynamic gain control is configured to periodically update a loop gain of the inner control loop.

Example Clause 22: The display device of clause 21, wherein the dynamic gain control is further configured to periodically update the loop gain according to a period in a range from a lower value to a higher value, wherein the lower value corresponding to one of: about 5 Hz, 10 Hz, 15 Hz, 20 Hz, 30 Hz, 60 Hz, or 90 Hz, and wherein the upper value corresponds to one of and about 10 Hz, 15 Hz, 20 Hz, 30 Hz, 60 Hz, 90 Hz, or 120 Hz; and wherein the upper value is greater than the lower value.

Example Clause 23: The display device of any of clauses herein, wherein the dynamic gain control is configured to limit the loop gain of the inner control in a range between a maximum value and a minimum value.

Example Clause 24: The display device of clause 1, wherein the dynamic gain control is configured to adjust an inner-loop feedback signal to achieve the target gain responsive to a comparison between one or more characteristics of the slow-scan drive signal and the slow-scan feedback signal, wherein the one or more characteristics comprise one or more of an amplitude, a maximum signal level, a minimum signal level, an mean or average signal level, a slope, a mean or average slope, a gain, a mean or average gain, an FFT analysis or a quotient.

Example Clause 25: The display device of clause 1, wherein the dynamic gain control of the display device comprises: an amplitude comparator that compares the amplitudes of the slow-scan drive signal and the slow-scan feedback signal; and a gain adjustor that adjusts the gain of the inner control loop responsive to the comparison and the target gain such that the slow-scan feedback signal is gain scaled by the adjusted gain to provide an inner-loop feedback signal.

Example Clause 26: The display device of clause 1, wherein the dynamic gain control of the display device comprises: an amplitude comparator that compares the amplitudes of the slow-scan drive signal and an inner-loop feedback signal; and a gain adjustor that adjusts the gain of the inner control loop responsive to the comparison and the target gain such that the slow-scan feedback signal is gain scaled by the adjusted gain to provide the inner-loop feedback signal.

Example Clause 27: The display device of clause 1, wherein the dynamic gain control (235) of the display device comprises: a slope comparator that compares the slopes of the slow-scan drive signal and the slow-scan feedback signal; and a gain adjustor that adjusts the gain of the inner control loop responsive to the comparison and the target gain such that the slow-scan drive signal is gain scaled by the adjusted gain to provide an inner-loop feedback signal.

Example Clause 28: The display device of clause 1, wherein the dynamic gain control (235) of the display device comprises: a slope comparator that compares the slopes of the slow-scan drive signal and the inner-loop feedback signal; and a gain adjustor that adjusts the gain of the inner control loop responsive to the comparison and the target gain such that the slow-scan drive signal is gain scaled by the adjusted gain to provide the inner-loop feedback signal.

Example Clause 29: The display device of clause 1, wherein the dynamic gain control of the display device comprises: a first buffer that captures the slow-scan drive signal; a second buffer that captures the slow-scan feedback signal; a comparator that compares one or more characteristics of the slow-scan drive signal and the slow-scan feedback signal; and a gain adjustor that adjusts the gain of the inner control loop responsive to comparison and the target gain such that the slow-scan feedback signal is gain scaled by thew adjusted gain to provide an inner-loop feedback signal.

Example Clause 30: The display device of clause 1, wherein the dynamic gain control of the display device comprises: a first buffer that captures the slow-scan drive signal; a second buffer that captures the inner-loop feedback signal; a comparator that compares one or more characteristics of the captured slow-scan drive signal and the captured inner-loop feedback signal; and a gain adjustor that adjusts the gain of the inner control loop responsive to comparison and the target gain such that the slow-scan feedback signal is gain scaled by thew adjusted gain to provide an inner-loop feedback signal.

Example Clause 31: The display device of clause 30, wherein the comparator is configured to compare the one or more characteristics as one or more of a slope, a mean or average slope, an amplitude, a maximum signal level, a minimum signal level, mean or average signal level, a slope, a mean or average slope, a gain, a mean or average gain, a spectral analysis, an FFT analysis, or a quotient thereof.

Example Clause 32: The display device of clause 1, wherein the dynamic gain control of the display device comprises: a first buffer that captures the slow-scan drive signal; a second buffer that captures the slow-scan feedback signal; a comparator that compares one or more characteristics of the captured slow-scan drive signal and the captured slow-scan feedback signal; and a gain adjustor comprising: a PID controller that receives the detected difference from the comparator and the target gain; and a gain controller that receives an output from the PID controller, wherein the PID controller is configured to adjusts the gain of the inner control loop responsive to the output from the PID controller such that the slow-scan feedback signal is gain scaled by the adjusted gain to provide an inner-loop feedback signal.

Example Clause 33: The display device of clause 32, wherein the comparator of the dynamic gain control in the display device is configured detect the difference in characteristics as one of an amplitude difference between the slow-scan drive signal and the slow-scan feedback signal, a slope difference between the slow-scan drive signal and the slow-scan feedback signal, and a spectral difference between the slow-scan drive signal and the slow-scan feedback signal.

Example Clause 34: The display device of clause 1, wherein the dynamic gain control of the display device comprises: a first buffer that captures the slow-scan drive signal; a second buffer that captures the inner-loop feedback signal; a comparator that compares one or more characteristics of the captured slow-scan drive signal and the captured inner-loop feedback signal; and a gain adjustor comprising: a PID controller that receives the detected difference from the comparator and the target gain; and a gain controller that receives an output from the PID controller, wherein the PID controller is configured to adjusts the gain of the inner control loop responsive to the output from the PID controller such that the slow-scan feedback signal is gain scaled by the adjusted gain to provide the inner-loop feedback signal.

Example Clause 35: The display device of clause 34, wherein the comparator of the dynamic gain control in the display device is configured detect the difference in characteristics as one of an amplitude difference between the slow-scan drive signal and the inner-loop feedback signal, a slope difference between the slow-scan drive signal and the inner-loop feedback signal, and a spectral difference between the slow-scan drive signal and the inner-loop feedback signal.

Example Clause 36: The display device of any of the clauses herein, wherein the slow-scan mirror is a microelectromechanical mirror assembly that includes a PZT driver material that exhibits gain loss due to operation and age, and wherein the display device is configure to mitigate gain loss of the PZT material by operation of the dynamic gain control of the inner control loop.

Example Clause 37: A display device to display an image in a display region, the display device comprising: a laser beam emitter configured to emit a laser beam; a slow-scan driver (231) to generate a slow-scan drive signal (232); a slow-scan mirror (220) that includes a PZT driver material that is responsive to the slow-scan drive signal (232) to drive a microelectromechanical system (MEMS) mirror to direct the laser beam to the display region to generate the image, and a PZR sensor material that is responsive to the motion of the MEMS mirror to generate a slow-scan feedback signal (233); a slow-scan controller (210) configured to adjust the slow-scan drive signal (232) for the slow-scan mirror (220) with the slow-scan driver (232), wherein the slow-scan controller (210) comprises: an outer control loop with an open angle control (215) for the slow-scan mirror (220); and an inner control loop (230) with a dynamic gain control (235) for the slow-scan mirror (220), wherein the outer control loop and the inner control loop are responsive to the slow-scan feedback signal (233), and wherein the inner control loop (230) is also responsive to the slow-scan drive signal (232) and adapted to dynamically adjust the gain of the inner-control loop to achieve a target gain such that overall gain variations from at least the slow-scan mirror are compensated and stabilized.

Example Clause 38: The display device of clause 37, wherein dynamic gain control of the slow-scan mirror in the inner control loop is configured to compensate for variations in the slow-scan mirror, wherein the variations in the slow-scan mirror comprise one or more of a variation in a gain of the PZR material, a variation in a gain of the MEMS mirror, a variation in a gain of the PZT material or variations in the slow-scan mirror due to operation and age.

Example Clause 39: The display device of clause 37, wherein dynamic gain control of the slow-scan mirror in the inner control loop is configured to compensate for variations in the slow-scan mirror based on an environmental property, wherein the environmental property comprises at least one of a temperature, a humidity, or a vibration level.

Example Clause 40: The display device of clause 37, wherein the dynamic gain control of the display device comprises: a first buffer that captures the slow-scan drive signal; a second buffer that captures the slow-scan feedback signal; a comparator that detects a difference in one or more characteristics of the captured slow-scan drive signal and the captured slow-scan feedback signal; and a gain adjustor that adjusts the gain of the inner control loop responsive to the detected difference and the target gain such that the slow-scan feedback signal is gain scaled by the adjusted gain to provide an inner-loop feedback signal.

Example Clause 41: The display device of clause 37, wherein the dynamic gain control of the display device comprises: a first buffer that captures the slow-scan drive signal; a second buffer that captures an inner-loop feedback signal; a comparator that detects a difference in one or more characteristics of the captured slow-scan drive signal and the captured inner-loop feedback signal; and a gain adjustor that adjusts the gain of the inner control loop responsive to the detected difference and the target gain such that the slow-scan feedback signal is gain scaled by the adjusted gain to provide the inner-loop feedback signal.

Example Clause 42: The display device of clause 37, wherein the comparator of the dynamic gain control in the display device is configured detect the difference in characteristics as one of an amplitude difference between the slow-scan drive signal and the slow-scan feedback signal, a slope difference between the slow-scan drive signal and the slow-scan feedback signal, a spectral difference between the slow-scan drive signal and the slow-scan feedback signal.

Example Clause 43: The display device of clause 37, wherein the comparator of the dynamic gain control in the display device is configured detect the difference in characteristics as one of an amplitude difference between the slow-scan drive signal and an inner-loop feedback signal, a slope difference between the slow-scan drive signal and the inner-loop feedback signal, a spectral difference between the slow-scan drive signal and the inner-loop feedback signal.

Example Clause 44: A display device to display an image in a display region, the display device comprising: a laser beam emitter configured to emit a laser beam; a slow-scan driver (231) to generate a slow-scan drive signal (232); a slow-scan mirror (220) that includes a PZT driver material that is responsive to the slow-scan drive signal (232) to drive a microelectromechanical system (MEMS) mirror to direct the laser beam to the display region to generate the image, and a PZR sensor material that is responsive to the motion of the MEMS mirror to generate a slow-scan feedback signal (233); a slow-scan controller (210) configured to adjust the slow-scan drive signal (232) for the slow-scan mirror (220) with the slow-scan driver (232), wherein the slow-scan controller (210) comprises: an outer control loop with an open angle control (215) for the slow-scan mirror (220); an inner control loop (230) with a dynamic gain control (235), wherein the dynamic gain control (235) comprises: a first buffer (310) that captures the slow-scan drive signal (232) as a first captured signal; a second buffer (320) that captures one of the slow-scan feedback signal (233) and an inner-loop feedback signal (236) as a second captured signal; a comparator (330) that compares a slope of the first captured signal and a slope of the second captured signal; and a gain adjustor (340) that adjusts the gain of the inner control loop (230) responsive to the comparison and the target gain such that the slow-scan feedback signal (233) is gain scaled by the adjusted gain to provide the inner-loop feedback signal (236), whereby overall gain variations from at least the slow-scan mirror are compensated and stabilized.

The subject matter of the present disclosure includes all novel and non-obvious combinations and sub-combinations of the various processes, systems and configurations, and other features, functions, acts, and/or properties disclosed herein, as well as any and all equivalents thereof.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. It is also understood that a "loop" or a "control loop" refers to any process, module, chipset, or any hardware or software component performing a set of operations that execute periodically. The period in which the set of operations repeat is based on a physical clock speed and/or any mechanism that controls a delay between each execution.

The subject matter of the present disclosure includes all novel and non-obvious combinations and sub-combinations of the various processes, systems and configurations, and other features, functions, acts, and/or properties disclosed herein, as well as any and all equivalents thereof.

We claim:

1. A system for displaying an image in a display region comprising:
    a slow-scan mirror that is responsive to a slow-scan drive signal to direct a laser beam onto the display region and generate the image, wherein the slow-scan mirror generates a slow-scan feedback signal;
    a slow-scan driver configured to generate the slow-scan drive signal; and
    a slow-scan controller configured to adjust the slow-scan drive signal for the slow-scan mirror with the slow-scan driver, wherein the slow-scan controller includes:
        an outer control loop with an open angle control for the slow-scan mirror; and
        an inner control loop with a dynamic gain control for the slow-scan mirror, wherein the outer control loop and the inner control loop are responsive to the slow-scan feedback signal, and wherein the inner control loop is also responsive to the slow-scan drive signal and adapted to dynamically adjust a gain of the inner control loop to achieve a target gain such that overall gain variations from at least the slow-scan mirror are compensated and stabilized, wherein the dynamic gain control is configured to maintain the gain of the inner control loop in a range between a maximum value and a minimum value.

2. The system of claim 1, wherein the dynamic gain control is configured to:
    receive the slow-scan drive signal;
    receive the slow-scan feedback signal;
    compare amplitudes of the slow-scan drive signal and the slow-scan feedback signal; and
    adjust the gain of the inner control loop responsive to the comparison and the target gain such that the slow-scan feedback signal is gain scaled by the adjusted gain to provide an inner-loop feedback signal.

3. The system of claim 1, wherein the dynamic gain control is configured to:
    receive the slow-scan drive signal;
    receive the slow-scan feedback signal;
    receive an inner-loop feedback signal;
    compare amplitudes of the slow-scan drive signal and the slow-scan feedback signal; and
    adjust the gain of the inner control loop responsive to the comparison and the target gain such that the slow-scan feedback signal is gain scaled by the adjusted gain to provide the inner-loop feedback signal.

4. The system of claim 1, wherein the dynamic gain control is configured to:
    receive the slow-scan drive signal;
    receive the slow-scan feedback signal;
    compare slopes of the slow-scan drive signal and the slow-scan feedback signal; and
    adjust the gain of the inner control loop responsive to the comparison and the target gain such that the slow-scan feedback signal is gain scaled by the adjusted gain to provide an inner-loop feedback signal.

5. The system of claim 1, wherein the dynamic gain control is configured to:
    receive the slow-scan drive signal;
    receive the slow-scan feedback signal;
    receive an inner-loop feedback signal;
    compare slopes of the slow-scan drive signal and the inner-loop feedback signal; and
    adjust the gain of the inner control loop responsive to the comparison and the target gain such that the slow-scan feedback signal is gain scaled by the adjusted gain to provide the inner-loop feedback signal.

6. The system of claim 1, wherein the dynamic gain control is configured to:
    receive the slow-scan drive signal;
    receive the slow-scan feedback signal;
    calculate a quotient of the amplitudes of the slow-scan drive signal and the slow-scan feedback signal; and
    adjust the gain of the inner control loop responsive to the calculated quotient and the target gain such that the slow-scan feedback signal is gain scaled by the adjusted gain to provide an inner-loop feedback signal.

7. The system of claim 1, wherein the dynamic gain control is configured to:
    receive the slow-scan drive signal;
    receive the slow-scan feedback signal;
    receive an inner-loop feedback signal;
    calculate a quotient of the amplitudes of the slow-scan drive signal and the inner-loop feedback signal; and
    adjust the gain of the inner control loop responsive to the calculated quotient and the target gain such that the slow-scan feedback signal is gain scaled by the adjusted gain to provide the inner-loop feedback signal.

8. The system of claim 1, wherein the dynamic gain control is configured to:
    receive the slow-scan drive signal;
    receive the slow-scan feedback signal;

determine a slope of the slow-scan drive signal;
determine a slope of the slow-scan feedback signal;
calculate a quotient of the slopes of the slow-scan drive signal and the slow-scan feedback signal; and
adjust the gain of the inner control loop responsive to the calculated quotient and the target gain such that the slow-scan feedback signal is gain scaled by the adjusted gain to provide an inner-loop feedback signal.

9. The system of claim 1, wherein the dynamic gain control is configured to:
receive the slow-scan drive signal;
receive the slow-scan feedback signal;
receive an inner-loop feedback signal;
determine a slope of the slow-scan drive signal;
determine a slope of the inner-loop feedback signal;
calculate a quotient of the slopes of the slow-scan drive signal and the inner loop feedback signal; and
adjust the gain of the inner control loop responsive to the calculated quotient and the target gain such that the slow-scan feedback signal is gain scaled by the adjusted gain to provide the inner-loop feedback signal.

10. The system of claim 1, wherein the dynamic gain control is configured to:
receive the slow-scan drive signal;
receive the slow-scan feedback signal;
receive an inner-loop feedback signal;
compare the slow-scan drive signal and the inner-loop feedback signal to identify a gain difference;
determine if the gain difference is above the target gain; and
adjust the gain of the inner control loop when the gain difference is above the target gain, responsive to one or more of the polarity or magnitude of the gain difference, such that the slow-scan feedback signal is gain scaled by the adjusted gain to provide the inner-loop feedback signal.

11. The system of claim 1, wherein the dynamic gain control is configured to adjust an inner-loop feedback signal to achieve the target gain responsive to a comparison between one or more characteristics of the slow-scan drive signal and the slow-scan feedback signal, wherein the one or more characteristics comprise one or more of an amplitude, a maximum signal level, a minimum signal level, a mean or average signal level, a slope, a mean or average slope, a gain, a mean or average gain, a spectral analysis, an FFT analysis, or a quotient.

12. The system of claim 1, wherein the dynamic gain control of the display device comprises:
an amplitude comparator that compares the amplitudes of the slow-scan drive signal and the slow-scan feedback signal; and
a gain adjustor that adjusts the gain of the inner control loop responsive to the comparison and the target gain such that the slow-scan feedback signal is gain scaled by the adjusted gain to provide an inner-loop feedback signal.

13. The system of claim 1, wherein the dynamic gain control comprises:
an amplitude comparator that compares the amplitudes of the slow-scan drive signal and an inner loop feedback signal; and
a gain adjustor that adjusts the gain of the inner control loop responsive to the comparison and the target gain such that the slow-scan feedback signal is gain scaled by the adjusted gain to provide the inner-loop feedback signal.

14. The system of claim 1, wherein the dynamic gain control comprises:
a slope comparator that compares the slopes of the slow-scan drive signal and the slow-scan feedback signal; and
a gain adjustor that adjusts the gain of the inner control loop responsive to the comparison and the target gain such that the slow-scan feedback signal is gain scaled by the adjusted gain to provide an inner-loop feedback signal.

15. The system of claim 1, wherein the dynamic gain control comprises:
a slope comparator that compares the slopes of the slow-scan drive signal and an inner loop feedback signal; and
a gain adjustor that adjusts the gain of the inner control loop responsive to the comparison and the target gain such that the slow-scan feedback signal is gain scaled by the adjusted gain to provide the inner-loop feedback signal.

16. The system of claim 1, wherein the dynamic gain control comprises:
a first buffer that captures the slow-scan drive signal;
a second buffer that captures the slow-scan feedback signal;
a comparator that compares one or more characteristics of the captured slow-scan drive signal and the captured slow-scan feedback signal; and
a gain adjustor that adjusts the gain of the inner control loop responsive to the comparison and the target gain such that the slow-scan feedback signal is gain scaled by the adjusted gain to provide an inner-loop feedback signal.

17. The system of claim 1, wherein the dynamic gain control comprises:
a first buffer that captures the slow-scan drive signal;
a second buffer that captures the inner-loop feedback signal;
a comparator that compares one or more characteristics of the captured slow-scan drive signal and the captured inner loop feedback signal; and
a gain adjustor that adjusts the gain of the inner control loop responsive to the comparison and the target gain such that the slow-scan feedback signal is gain scaled by the adjusted gain to provide an inner-loop feedback signal.

18. The system of claim 1, wherein the dynamic gain control comprises:
a first buffer that captures the slow-scan drive signal;
a second buffer that captures the slow-scan feedback signal;
a comparator that compare one or more characteristics of the captured slow-scan drive signal and the captured slow-scan feedback signal; and
a gain adjustor comprising:
a PID controller that receives a detected difference from the comparator and the target gain; and
a gain controller that receives an output from the PID controller, wherein the gain controller is configured to adjust the gain of the inner control loop responsive to the output from the PID controller such that the slow-scan feedback signal is gain scaled by the adjusted gain to provide the inner-loop feedback signal.

19. The system of claim 1, wherein the dynamic gain control comprises:
- a first buffer that captures the slow-scan drive signal;
- a second buffer that captures the inner loop feedback signal;
- a comparator that compare one or more characteristics of the captured slow-scan drive signal and the captured inner loop feedback signal; and
- a gain adjustor comprising:
  - a PID controller that receives a detected difference from the comparator and the target gain; and
  - a gain controller that receives an output from the PID controller, wherein the gain controller is configured to adjust the gain of the inner control loop responsive to the output from the PID controller such that the slow-scan feedback signal is gain scaled by the adjusted gain to provide the inner loop feedback signal.

* * * * *